US009368803B2

(12) United States Patent
Park et al.

(10) Patent No.: US 9,368,803 B2
(45) Date of Patent: Jun. 14, 2016

(54) COMPOSITION, METHOD OF PREPARING THE COMPOSITION, ELECTRODE INCLUDING THE COMPOSITION, AND FUEL CELL INCLUDING THE ELECTRODE

(75) Inventors: Jung-ock Park, Yongin-si (KR); Seong-woo Choi, Yongin-si (KR); Woo-sung Jeon, Suwon-si (KR); Jung-seok Yi, Seoul (KR); Oemer Uensal, Mainz (DE)

(73) Assignee: SAMSUNG ELECTRONICS CO., LTD. (KR)

( * ) Notice: Subject to any disclaimer, the term of this patent is extended or adjusted under 35 U.S.C. 154(b) by 887 days.

(21) Appl. No.: 13/039,745

(22) Filed: Mar. 3, 2011

(65) Prior Publication Data
US 2011/0217627 A1 Sep. 8, 2011

(30) Foreign Application Priority Data

Mar. 3, 2010 (KR) .................. 10-2010-0019027
Feb. 28, 2011 (KR) .................. 10-2011-0018011

(51) Int. Cl.
| *H01M 4/02* | (2006.01) |
| *H01M 4/86* | (2006.01) |
| *C08G 73/02* | (2006.01) |
| *C08L 79/02* | (2006.01) |
| *H01M 4/88* | (2006.01) |
| *H01M 4/92* | (2006.01) |
(Continued)

(52) U.S. Cl.
CPC ......... *H01M 4/8668* (2013.01); *C08G 73/0233* (2013.01); *C08L 79/02* (2013.01); *H01M 4/8828* (2013.01); *H01M 4/8835* (2013.01); *H01M 4/8882* (2013.01); *H01M 4/8892* (2013.01); *H01M 4/92* (2013.01); *H01M 4/921* (2013.01); *H01M 8/086* (2013.01); *H01M 2008/1095* (2013.01); *Y02E 60/50* (2013.01); *Y02E 60/522* (2013.01); *Y02P 70/56* (2015.11)

(58) Field of Classification Search
CPC ... H01M 4/86; H01M 4/8668; H01M 4/8828; H01M 4/8835; H01M 4/8882; H01M 4/92; H01M 4/921; H01M 4/8892; H01M 8/086; H01M 2008/1095; C08G 73/0233; C08L 79/02; Y02E 60/50; Y02E 60/522
USPC .......................................... 429/530; 524/528
See application file for complete search history.

(56) References Cited

U.S. PATENT DOCUMENTS 4,557,979 A * 12/1985 Higginbottom et al. ...... 428/460
4,772,678 A    9/1988 Sybert et al.
(Continued)

FOREIGN PATENT DOCUMENTS

EP    0149989 A2    7/1985
EP    2036912 A1    3/2009
(Continued)

OTHER PUBLICATIONS

Extended European Search Report for Application No. 11156838.2-2115 dated Jan. 4, 2013.
(Continued)

*Primary Examiner* — Gary Harris
(74) *Attorney, Agent, or Firm* — Cantor Colburn LLP

(57) ABSTRACT

A composition containing a uniformly dispersed polyoxazine-based compound, a method of preparing the composition, an electrode including the composition, and a fuel cell including the electrode.

16 Claims, 5 Drawing Sheets

(51) Int. Cl.
*H01M 8/08* (2016.01)
*H01M 8/10* (2016.01)

(56) References Cited

U.S. PATENT DOCUMENTS

| | | | |
|---|---|---|---|
| 5,723,086 | A | 3/1998 | Ledjeff et al. |
| 6,746,792 | B2 * | 6/2004 | Hasegawa et al. ............ 429/454 |
| 2005/0256296 | A1 | 11/2005 | Kiefer et al. |
| 2006/0211844 | A1 | 9/2006 | Kim et al. |
| 2007/0020507 | A1 | 1/2007 | Kim et al. |
| 2007/0141426 | A1 * | 6/2007 | Choi et al. ...................... 429/33 |
| 2007/0184323 | A1 | 8/2007 | Lee et al. |
| 2008/0145743 | A1 | 6/2008 | Choi et al. |
| 2009/0075147 | A1 | 3/2009 | Kitamura et al. |
| 2009/0075148 | A1 * | 3/2009 | Choi et al. ...................... 429/33 |
| 2009/0098437 | A1 | 4/2009 | Choi et al. |
| 2009/0117436 | A1 * | 5/2009 | Choi .................... C08J 5/2256 429/494 |
| 2010/0159347 | A1 | 6/2010 | Choi et al. |

FOREIGN PATENT DOCUMENTS

| | | | |
|---|---|---|---|
| EP | 2056390 | A1 | 5/2009 |
| JP | 60-177074 | A | 9/1985 |
| JP | 60-177199 | A | 9/1985 |
| JP | 8-504293 | | 5/1996 |
| JP | 11071498 | A * | 3/1999 ............ C08L 61/34 |
| JP | 11-97011 | | 4/1999 |
| JP | 2003-255487 | | 9/2003 |
| JP | 2003-257491 | | 9/2003 |
| JP | 2005-85638 | | 3/2005 |
| JP | 2007-188753 | | 7/2007 |
| JP | 2007-519183 | | 7/2007 |
| JP | 2009057437 | A * | 3/2009 |
| KR | 10-2006-0001625 | | 1/2006 |
| KR | 10-2006-0100689 | | 9/2006 |
| KR | 10-2006-0108792 | | 10/2006 |
| KR | 10-2007-0080483 | | 8/2007 |
| KR | 10-2008-0008754 | | 1/2008 |
| KR | 10-0829554 | | 5/2008 |
| KR | 10-2008-0055510 | | 6/2008 |
| KR | 10-2009-0027183 | | 3/2009 |
| KR | 10-2009-0037117 | | 4/2009 |
| KR | 10-2009-0045655 | | 5/2009 |
| KR | 10-2010-0069625 | | 6/2010 |
| WO | WO 2005/060444 | | 7/2005 |
| WO | WO 2005/063852 | | 7/2005 |

OTHER PUBLICATIONS

Stephen J. Krause et al., "Morphology and mechanical properties of a phase separated and a molecular composite 30% PBT/70% ABPBI triblock copolymer", *Polymer*, 1988, vol. 29, pp. 195-206.

Yi-Che Su et al., "Synthesis and characterization of fluorinated polybenzoxazine material with low dielectric constant", *Polymer* 44 (2003) pp. 7989-7996.

Juan Antonio Asensio et al., "Polymer Electrolyte Fuel Cells Based on Phosphoric Acid-Impregnated Poly (2, 5-benzimidazole) Membranes", *Journal of the Electrochemical Society*, 151 (2004), pp. A304-A310.

Hyoung-Juhn Kim et al., "Polybenzimidazoles for High Temperature Fuel Cell Applications", *Macromolecular Rapid Commun.* 2004, 25, pp. 1410-1413.

Palanichamy Krishnan et al., "Performance of a poly(2,5-benzimidazole) membrane based high temperature PEM fuel cell in the presence of carbon monoxide", *Journal of Power Sources* 159 (2006), pp. 817-823.

Jeong-Hi Kim et al., "Dependence of the performance of a high-temperature polymer electrolyte fuel cell on phosphoric acid-doped polybenzimidazole ionomer content in cathode catalyst layer", *Journal of Power Sources* 170 (2007), pp. 275-280.

C. Wannek et al., "Durability of ABPBI-based MEAs for High Temperature PEMFCs at Different Operating Conditions", *Fuel Cells* 08, 2008, No. 2, pp. 87-95.

U.S. Appl. No. 13/019,591, filed Feb. 2, 2011, Seong-woo Choi et al.
U.S. Appl. No. 13/020,385, filed Feb. 3, 2011, Seong-woo Choi et al.
U.S. Appl. No. 13/019,625, filed Feb. 2, 2011, Seong-woo Choi et al.
U.S. Appl. No. 13/020,035, filed Feb. 3, 2011, Seong-woo Choi et al.
International Search Report for International Application No. PCT/KR2011/001466 dated Nov. 30, 2011.
Japanese Office Action for Japanese Patent Application Serial No. JP2011-046347 issued Jun. 3, 2014, with partial English translation.

* cited by examiner

COMPOSITION, METHOD OF PREPARING THE COMPOSITION, ELECTRODE INCLUDING THE COMPOSITION, AND FUEL CELL INCLUDING THE ELECTRODE

CROSS-REFERENCE TO RELATED APPLICATIONS

This application claims the benefit of Korean Patent Application Nos. 10-2010-0019027, filed on Mar. 3, 2010, and 10-2011-0018011, filed Feb. 28, 2011, both filed in the Korean Intellectual Property Office, the disclosures of which are incorporated herein by reference.

BACKGROUND

1. Field

Aspects of the present disclosure relate to a composition, a method of preparing the composition, an electrode including the composition, and a fuel cell including the electrode.

2. Description of the Related Art

Phosphoric acid fuel cells, which operate at temperatures of from 150 to 200° C., include phosphoric acid as an electrolyte. However, a large amount of liquid phosphoric acid in electrodes hinders diffusion of gas into the electrodes. Therefore, an electrode catalyst layer including a mixture of a catalyst and polytetrafluoroethylene (PTFE) as a waterproof agent has been used in order to prevent fine pores in the electrodes from being clogged by the phosphoric acid.

High-temperature, non-humidified polymer electrolyte membrane fuel cells operate at a temperature of 150-200° C. In order to ensure such PEMFCs operate at high temperatures for a long duration, materials for electrodes should have long lifetime characteristics.

A binder used to form an electrode plays an importance role in distributing phosphoric acid in the electrode, structuring the electrode, and maintaining performance of the electrode during operation of the fuel cell. A waterproof polymer such as polytetrafluoroethylene (PTFE) may be used as a binder for electrodes.

However, currently known binders are not satisfactory in terms of resistance to phosphoric acid and heat resistance, and thus, there is still a demand for further improvement.

SUMMARY

Aspects of the present invention provide a composition with good dispersibility, a method of preparing the composition, an electrode using the composition, and a fuel cell including the electrode.

An aspect of the present invention provides a composition including a dispersion medium, and polyoxazine-based compound particles dispersed in the dispersion medium.

Another aspect of the present invention provides a method of preparing the composition described above, which method includes: mixing an oxazine-based monomer and an acid to prepare an acid solution of the oxazine-based monomer; thermally treating the acid solution of the oxazine-based monomer to obtain a polymerization product; separating the polyoxazine-based compound from the polymerization product; and dispersing the polyoxazine-based compound in a dispersion medium.

Another aspect of the present invention provides an electrode including: a support; and a catalyst layer disposed on the support, where the catalyst layer includes a coated product of the composition described above.

Another aspect of the present invention provides a fuel cell including the electrode described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
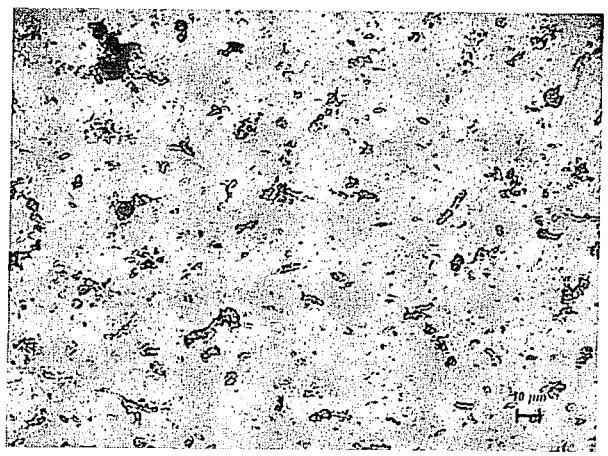
FIG. 1 is an image showing a result of average particle diameter analysis on a polybenzoxazine-based compound prepared according to Example 1.

Reference will now be made in detail to the present embodiments of the present invention, examples of which are illustrated in the accompanying drawings. The embodiments are described below in order to explain the present invention by referring to the figures.

An aspect of the present invention includes a composition including a dispersion medium, and polyoxazine-based compound particles dispersed in the dispersion medium.

As described above, the polyoxazine-based compound particles in the composition are dispersed, not solubilized, in the dispersion medium. Thus, various kinds of dispersion mediums that may disperse, not sublize, the polyoxazine-based compound particles may be used.

The dispersion medium for dispersing the polyoxazine-based compound particles may be an organic compound having a density of about 0.5 to about 2.0 mg/cm$^3$.

When the density of the dispersion medium is within this range, the polyoxazine-based compound particles may have good dispersibility.

The dispersion medium may be at least one material selected from the group consisting of alcohol, water, acids, and hydrocarbonic solvents.

Examples of hydrocarbonic solvents include N-methylpyrrolidine, dimethylacetamide, toluene, benzene, xylene, and the like. Examples of the alcohol include methanol, ethanol, isopropanol, butanol, and the like.

For example, the acid may be a phosphoric acid-based material.

Examples of the phosphoric acid-based material include polyphosphoric acid, phosphonic acid ($H_3PO_3$), an organic phosphonic acid, ortho-phosphoric acid ($H_3PO_4$), pyro-phosphoric acid ($H_4P_2O_7$), triphosphoric acid ($H_5P_3O_{10}$), meta-phosphoric acid, derivatives thereof, and the like.

The concentration of the acid may be at least 80 wt %, 90 wt %, 95 wt %, or 98 wt %. For example, the concentration of the acid may be in the range of about 80 to about 98 wt %.

The amount of the polyoxazine-based compound particles in the polyoxazine-based compound composition may be in the range of about 1 to about 80 wt % based on the total weight of the polyoxazine-based compound composition.

The composition may be used as a composition for forming an electrode catalyst layer, for example, of a fuel cell.

A method of preparing the composition will now be described below.

A polyoxazine-based compound is obtained by polymerizing an oxazine-based monomer and has resistance to acid and heat. However, the polyoxazine-based compound is hard, and thus it is not easy to process the polyoxazine-based compound in powder form having a small particle diameter. The process of polymerizing the oxazine-based monomer to obtain the polyoxazine-based compound involves a process using acid as a catalyst to obtain a dispersion of the polymer having a small particle diameter.

First, an oxazine-based monomer is dissolved in an acid to prepare an acid solution of the benzoxazine-based monomer.

The oxazine-based monomer may be dissolved in the acid at a temperature of about 50 to about 100° C. When the oxazine-based monomer is dissolved in the acid within this temperature range, solubility of the oxazine-based monomer and polymerization yield are increased.

Next, the acid solution of the oxazine-based monomer is thermally treated for polymerization.

The acid solution consists of an acid and water. For example, the acid may be a phosphoric acid-based material. Examples of the phosphoric acid-based material include polyphosphoric acid, phosphonic acid ($H_3PO_3$), an organic phosphonic acid, ortho-phosphoric acid ($H_3PO_4$), pyro-phosphoric acid ($H_4P_2O_7$), triphosphoric acid ($H_5P_3O_{10}$), meta-phosphoric acid, derivatives thereof, and the like.

Examples of the polyphosphoric acid include known phosphoric acids, for example, available from Riedel-de Haen Inc. The concentration of the polyphosphoric acid, which is represented by $H_{n+2}P_nO_{3n+1}$ (n>1), may be at least 85% when calculated based on $P_2O_5$ by acidimetry.

The concentration of the acid may be at least 80 wt %, 90 wt %, 95 wt %, or 98 wt %. For example, the concentration of the acid may be in the range of about 80 to about 98 wt %.

The amount of the acid in the acid solution may be in the range of about 1,000 to about 100,000 parts by weight, for example, about 6,000 to about 20,000 parts by weight, based on 100 parts by weight of the oxazine-based monomer. When the amount of the acid is within this range, reactivity of the polymerization of the oxazine-based monomer may be good.

The thermal treatment may be performed at a temperature of about 150 to 250° C., for example, at a temperature of about 150 to about 200° C. When the temperature of the thermal treatment is within this range, the polyoxazine-based compound composition may have a small particle size and a high yield.

The polyoxazine-based compound is separated from the polymerized product through a work-up process.

The work-up process involves, for example, adding water to the polymerized product to obtain a solution and centrifuging the solution to remove the acid component and separate the solid component from the polymerized product.

Next, water is added to the separated polyoxazine-based compound to obtain the polyoxazine-based compound composition.

The polyoxazine-based compound composition may contain about 1 to about 80 wt % of the polyoxazine-based compound. The polyoxazine-based compound may have an average particle diameter of about 0.5 to about 10 μm.

When the amount of the polyoxazine-based compound in the composition is within this range, dispersibility of the polyoxazine-based compound may be good. When the average particle diameter of the polyoxazine-based compound in the composition is within this range, the polyoxazine-based compound may have good dispersibility in an electrode catalyst layer.

The polyoxazine-based compound has excellent resistance to heat at up to about 300° C. The polybenzoxazine-based compound is insoluble in an acid, such as phosphoric acid, at a temperature of about 150 to about 200° C., for example at about 180° C. The polyoxazine-based compound has good ability to retain acid, such as phosphoric acid. When general oxazine-based monomers are used to manufacture an electrode, unreacted oxazine-based monomers may remain as impurities in the electrode, thereby lowering performance of the electrode. However, this problem may be prevented when the oxazine-based compound prepared as described above according to aspects of the present invention are used.

The composition prepared as described above may be used as a binder for an electrode of a fuel cell.

The oxazine-based monomer may be at least one selected from the group consisting of compounds represented by Formulae 1 through 6 below, but are not limited thereto.

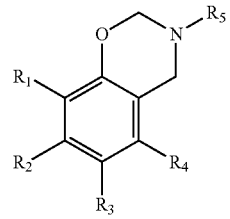

Formula 1

In Formula 1, $R_1$ through $R_4$ are each, independently, a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic oxy group, a substituted or unsubstituted $C_2$-$C_{20}$ heterocyclic group, a halogen atom, a hydroxyl group, or a cyano group, and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, Formula 2

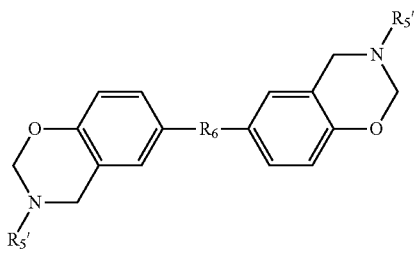

In Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted. $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

Formula 3

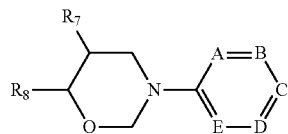

In Formula 3, A, B, C, D and E are all carbon; or one or two of A, B, C, D and E is nitrogen and the others are carbon, and $R_7$ and $R_9$ may be linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

Formula 4

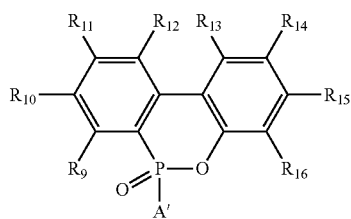

In Formula 4, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group, and $R_9$ through $R_{16}$ are each, independently, a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group.

Formula 5

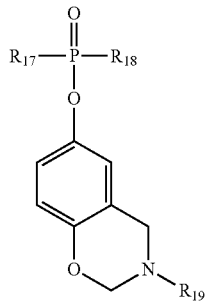

In Formula 5, $R_{17}$ and $R_{18}$ are each, independently, a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 5A below.

Formula 5A

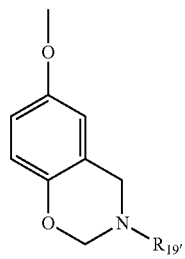

In Formulae 5 and 5A, $R_{19}$ and $R_{19'}$ are each, independently, a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group.

Formula 6

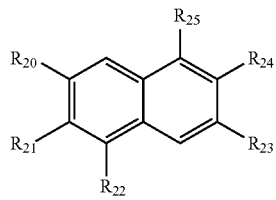

In Formula 6, at least two adjacent groups selected from among $R_{20}$, $R_{21}$ and $R_{22}$ are linked to form a group represented by Formula 6A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group, and at least two adjacent groups selected from among $R_{23}$, $R_{24}$ and $R_{25}$ are linked to form the group represented by Formula 6A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, or a halogenated $C_1$-$C_{20}$ heterocyclic group.

Formula 6A

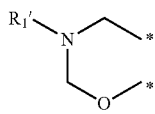

In Formula 6A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and

* denotes the sites at which the at least two adjacent groups selected from among $R_{20}$, $R_{21}$ and $R_{22}$ of Formula 6 and the at least two adjacent groups selected from among $R_{23}$, $R_{24}$ and $R_{25}$ are linked, respectively.

$R_1'$ in Formula 6A above may be selected from the groups represented by the following formulae.

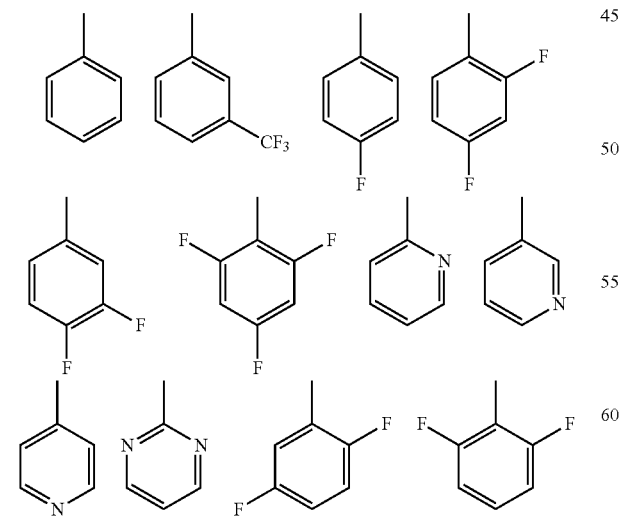

Examples of the compound of Formula 1 may include compounds represented by Formulae 7-55 below.

Formula 7

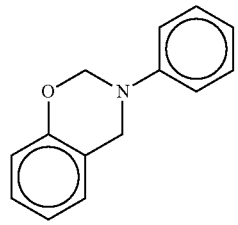

Formula 8

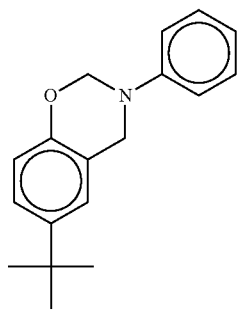

Formula 9

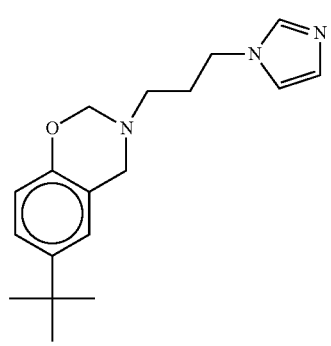

Formula 10

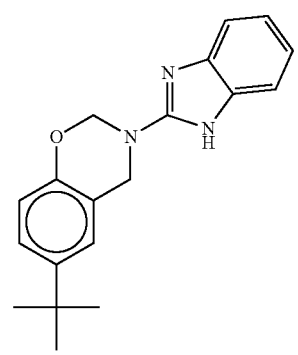

Formula 11

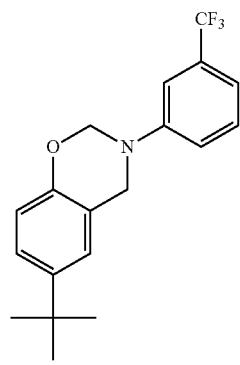

Formula 12
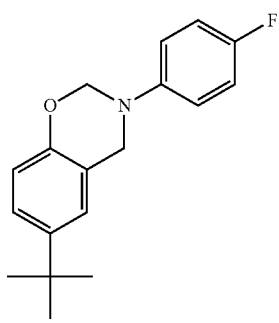
Formula 13
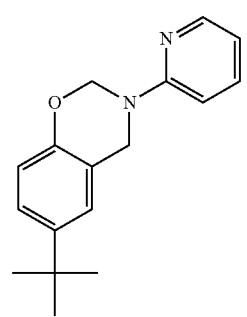
Formula 14
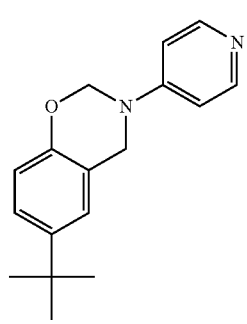
Formula 15
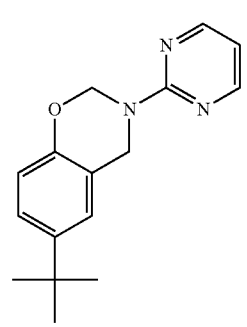
Formula 16
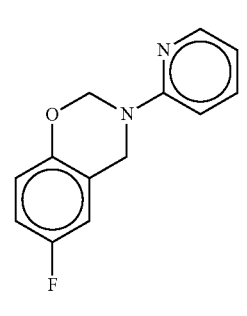
Formula 17
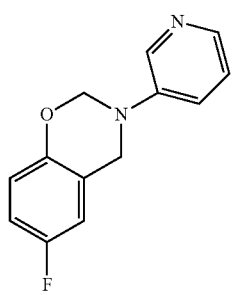
Formula 18
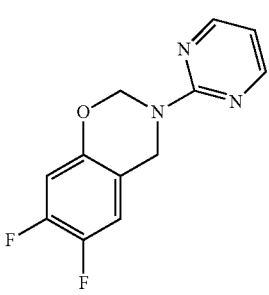
Formula 19
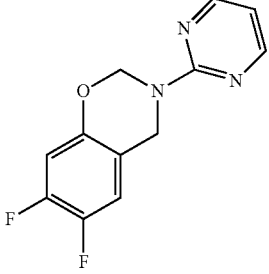
Formula 20
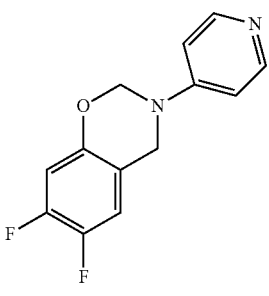
Formula 21

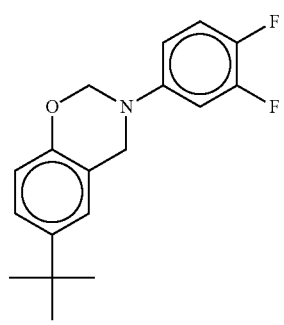
Formula 22
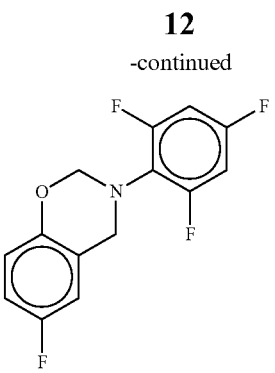
Formula 27
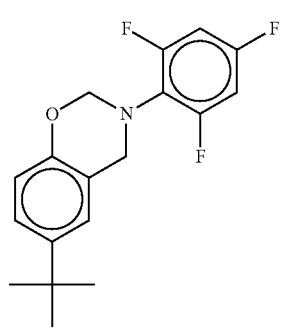
Formula 23
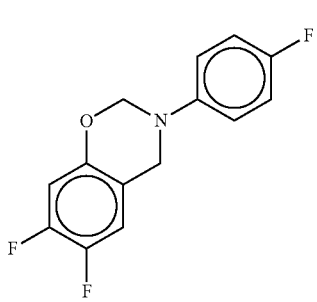
Formula 28
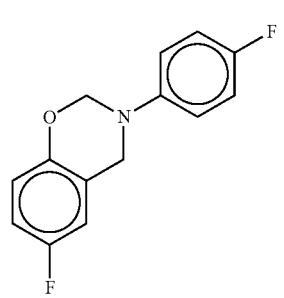
Formula 24
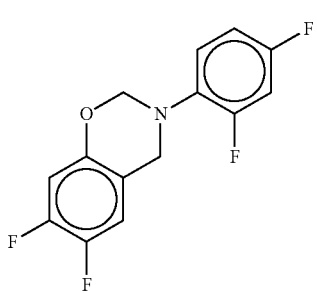
Formula 29
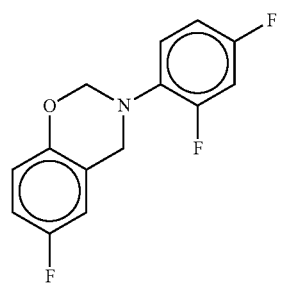
Formula 25
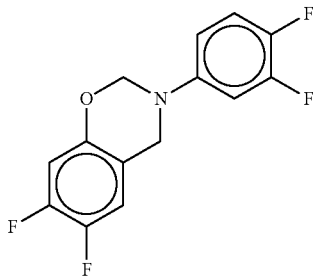
Formula 30
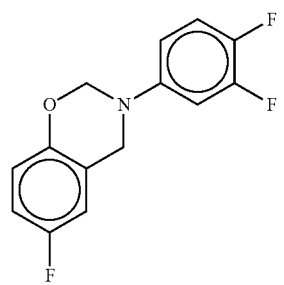
Formula 26
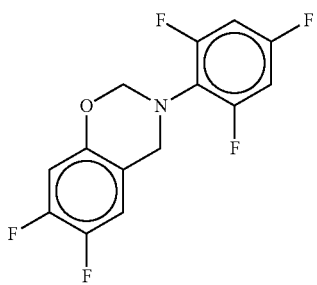
Formula 31

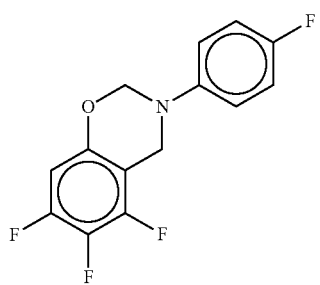
Formula 32
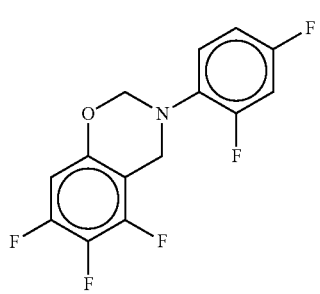
Formula 33
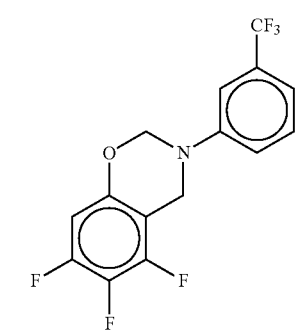
Formula 34
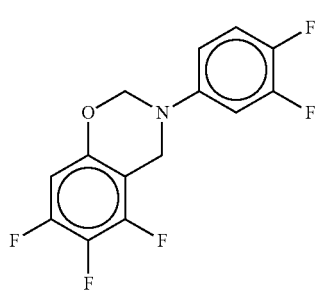
Formula 35
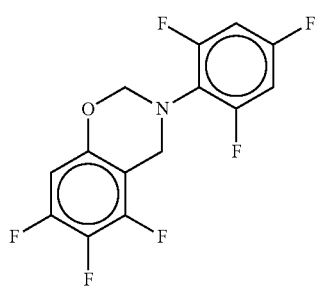
Formula 36
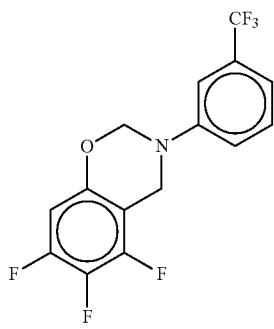
Formula 37
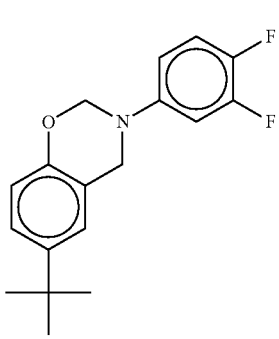
Formula 38
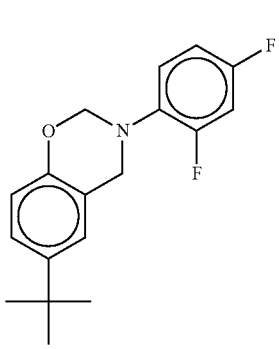
Formula 39
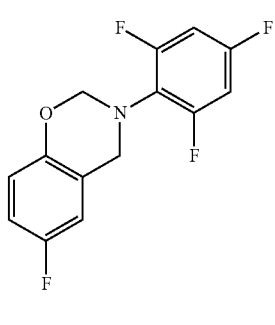
Formula 40
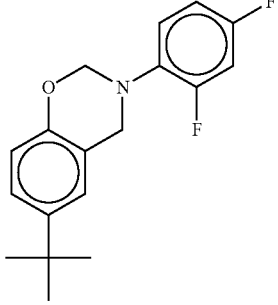
Formula 41

Formula 42
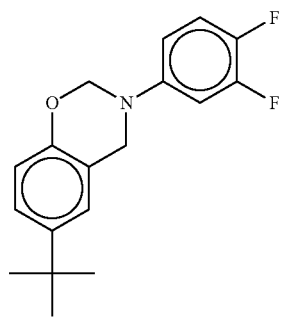
Formula 43
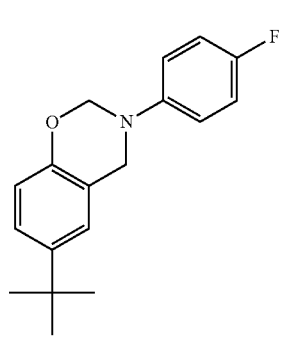
Formula 44
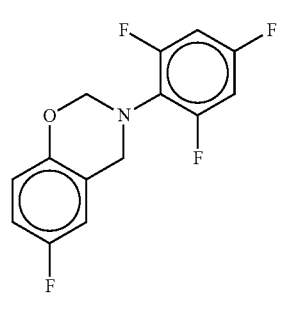
Formula 45
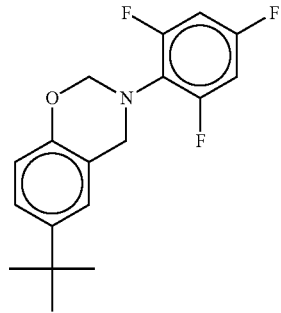
Formula 46
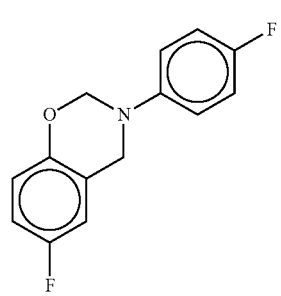
Formula 47
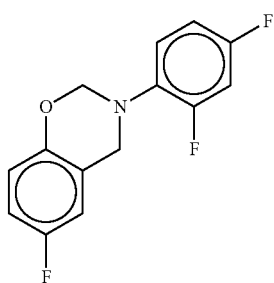
Formula 48
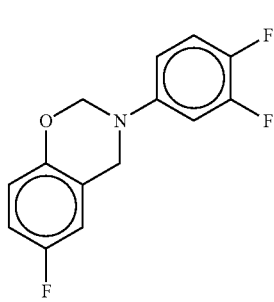
Formula 49
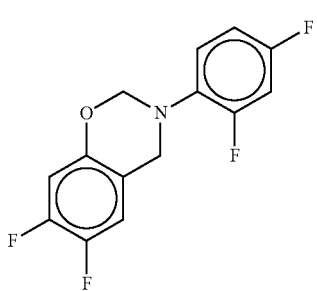
Formula 50
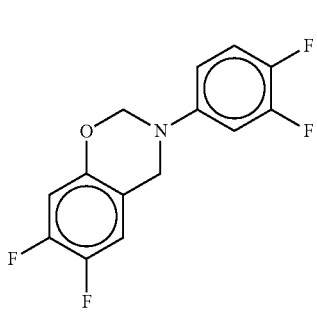
Formula 51
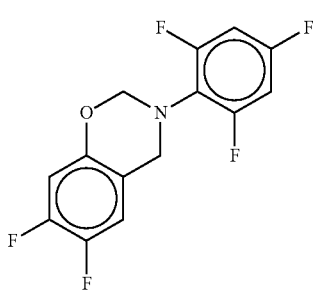

Formula 52
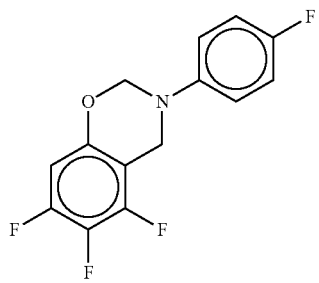
Formula 53
Formula 54
Formula 55
Examples of the compound of Formula 2 may include compounds represented by Formula 56-60 below.
Formula 56
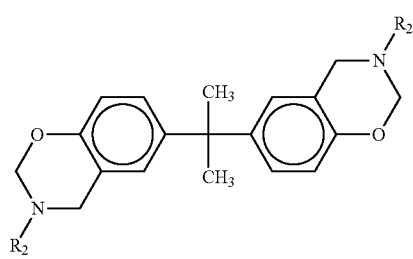
Formula 57
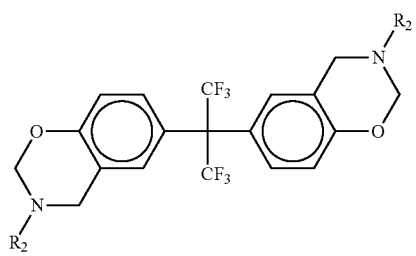
Formula 58
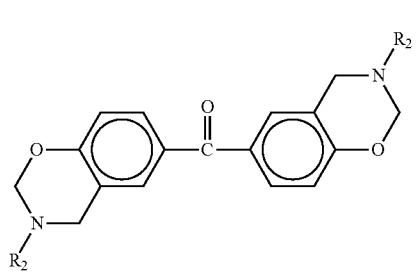
Formula 59
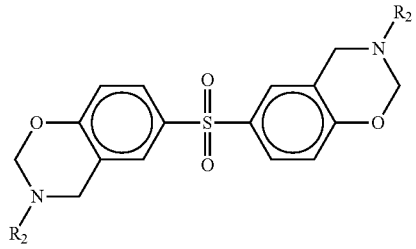
Formula 60
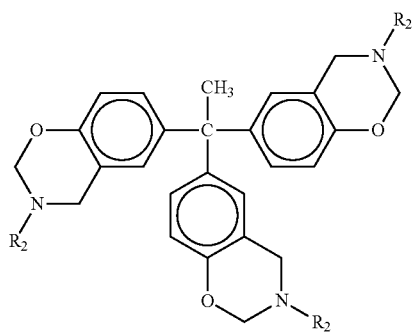
In Formulae 56-60 above, $R_2$ is 4-tert-butylphenyl, —$CH_2$—CH=$CH_2$, or one of the groups represented by Formulae 62 below:
Formulae 61
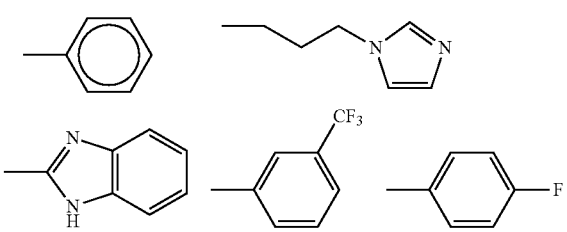

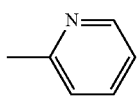 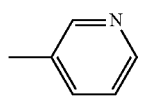 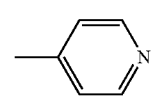
For example, the compound of Formula 2 may be selected from the compounds represented by Formulae 62, 63, 64, 65, and 66:
Formula 62
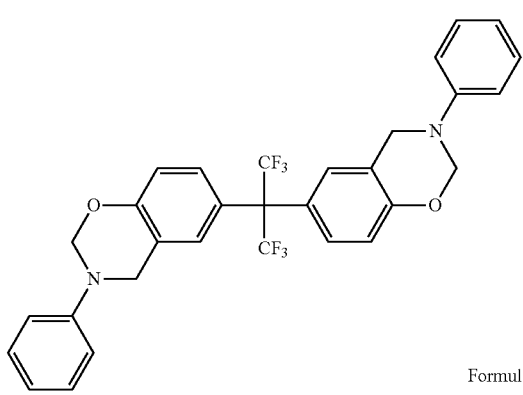
Formula 63
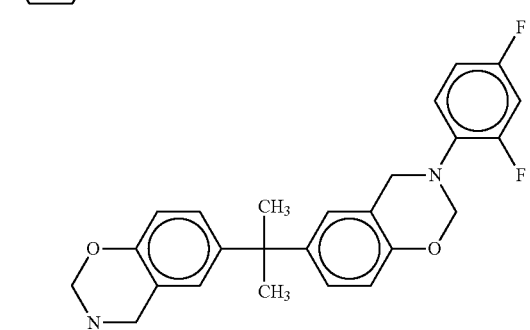
Formula 64
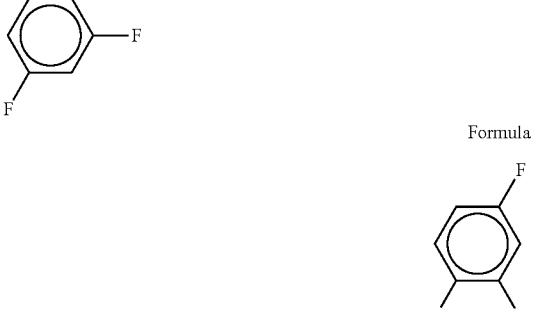
Formula 65
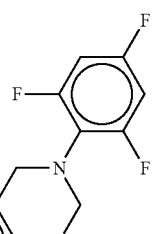
Formula 66
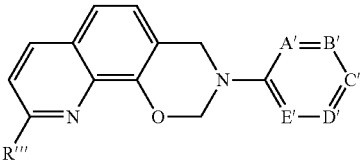
Examples of the compound of Formula 3 may include compounds represented by Formulae 67-70 below.
Formula 67
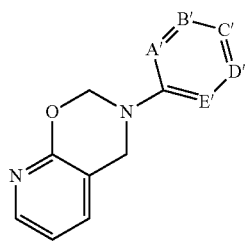
In Formula 67, R''' is a hydrogen atom or a $C_1$-$C_{10}$ alkyl group, and
Formula 68

Formula 69
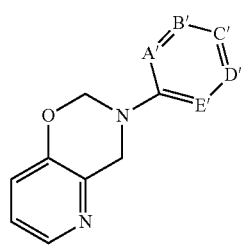
Formula 70
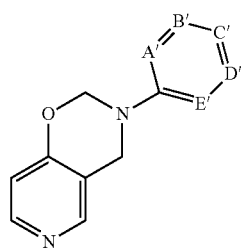
In Formulae 67-70,
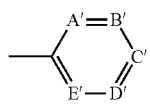
is selected from the groups represented by Formulae 71 below.
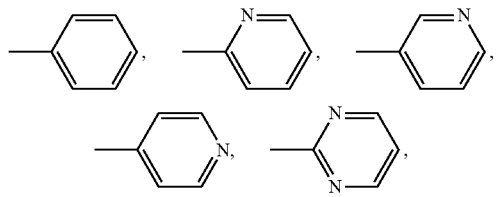
Examples of the compound of Formula 3 may include compounds represented by Formulae 72-94 below.
Formula 72
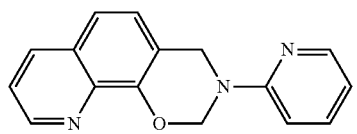
Formula 73
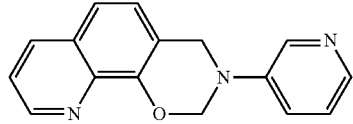
Formula 74
Formula 75
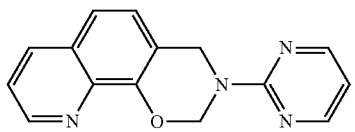
Formula 76
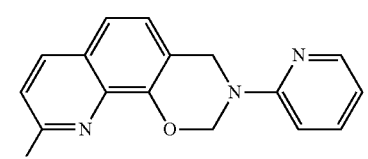
Formula 77
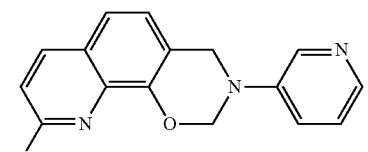
Formula 78
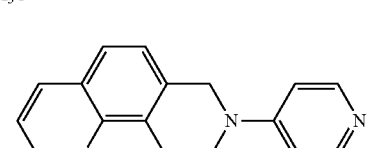
Formula 79
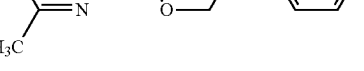
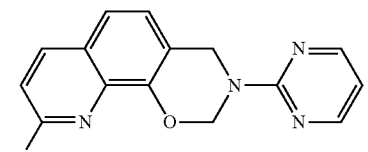
Formula 80
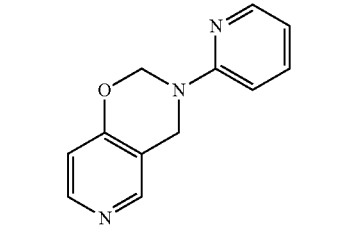
Formula 81
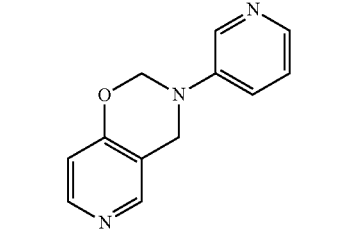
Formula 82
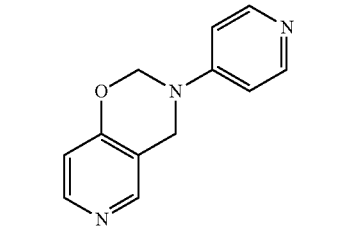

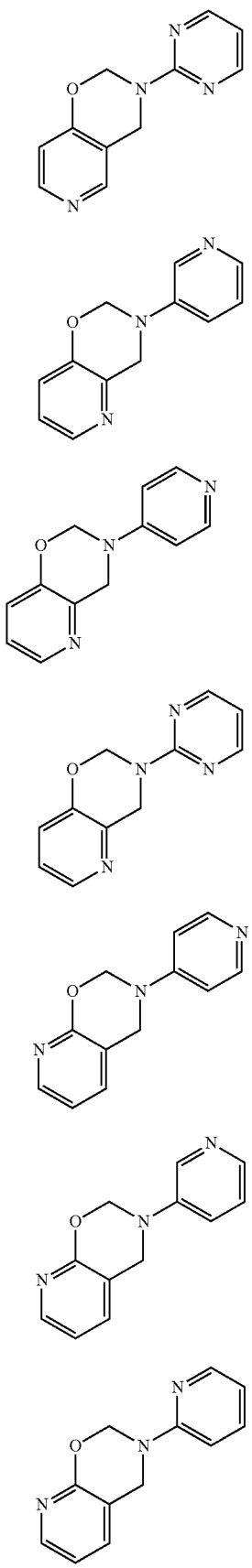
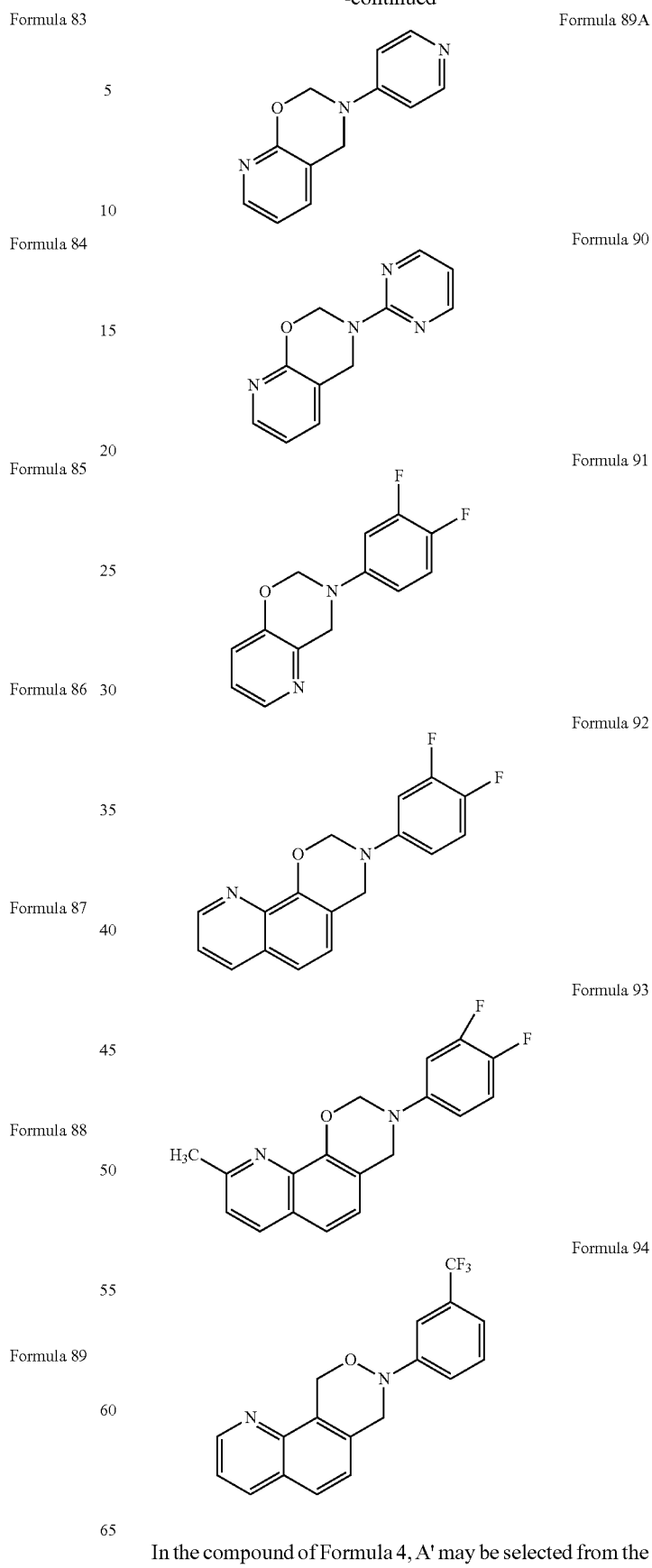
In the compound of Formula 4, A' may be selected from the groups represented by Formulae 95 and 96 below.

Formula 95

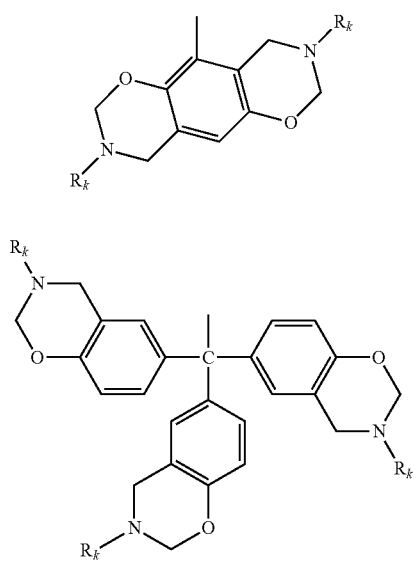

Formula 96

Formulae 99

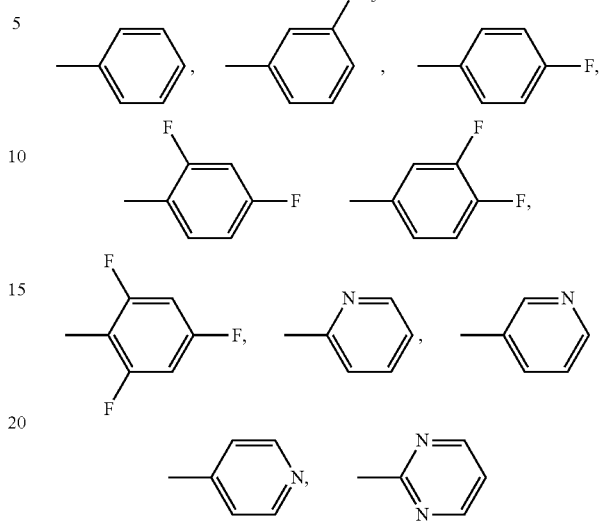

In Formulae 95 and 96, $R_1$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

Examples of the compound of Formula 4 include compounds represented by Formulae 97 and 98 below.

Formula 97

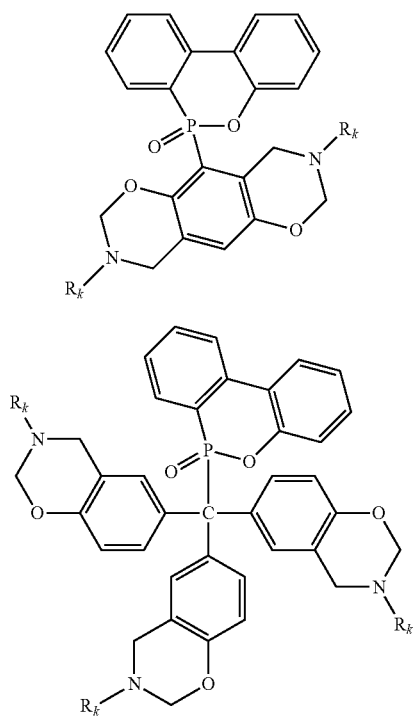

Formula 98

In Formulae 97 and 98, $R_k$ is selected from the groups represented by Formulae 99 below.

The compound of Formula 4 may be selected from the compounds represented by Formulae 100-105 below:

Formula 100

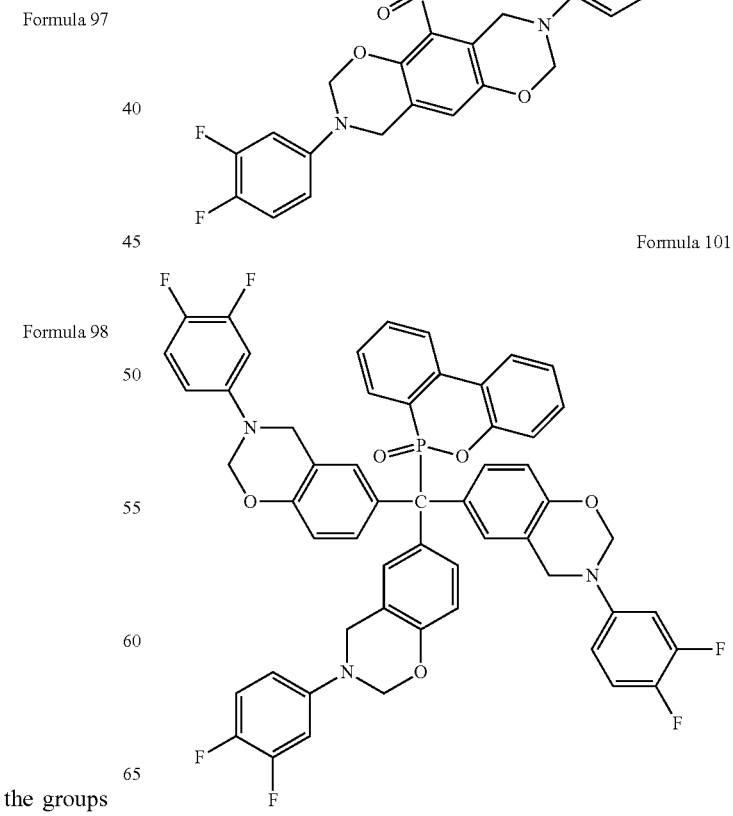

Formula 101

Formula 102
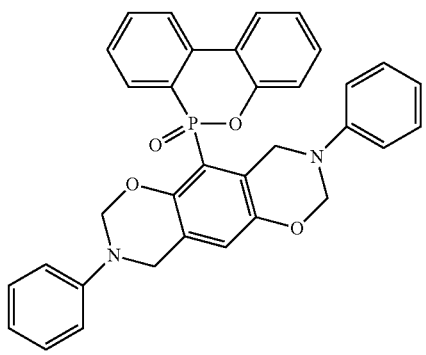
Formula 103
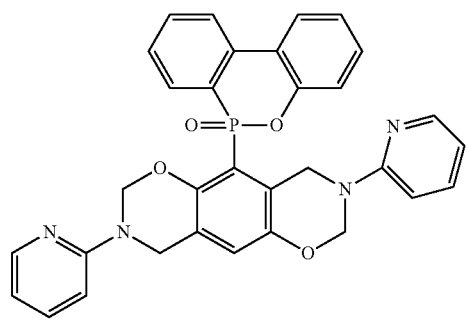
Formula 104
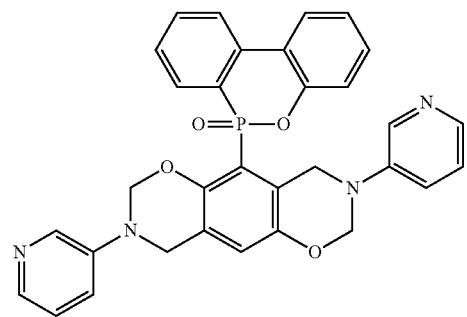
Formula 105
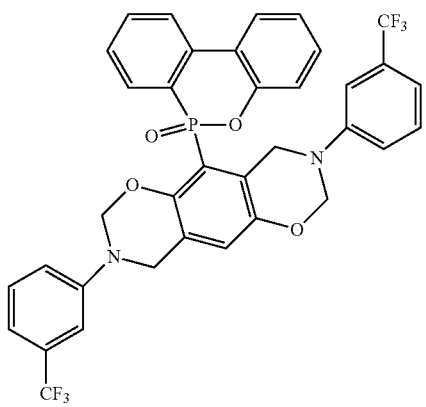
Formula 106
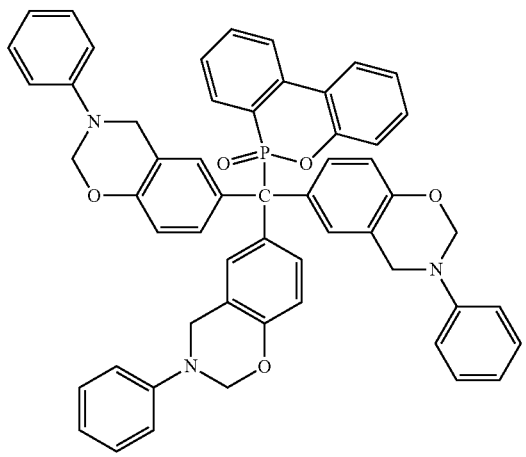
Examples of the compound of Formula 5 include compounds represented by Formulae 107, 108, and 110 below.
Formula 107
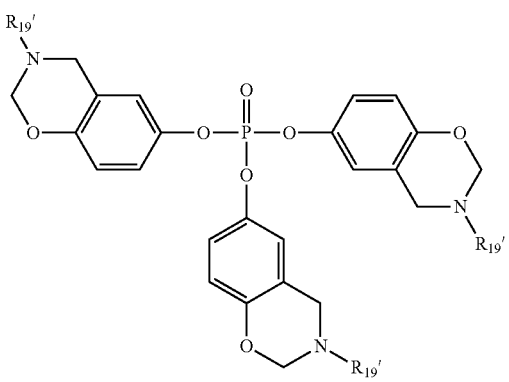
Formula 108
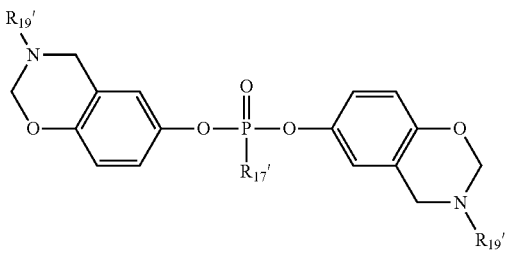
In Formulae 107 and 108, $R_{17}'$ is a $C_1$-$C_{10}$ alkyl group, a $C_1$-$C_{10}$ alkoxy group, a $C_6$-$C_{10}$ aryl group, or a $C_6$-$C_{10}$ aryloxy group; and $R_{19}'$ is selected from the groups represented by Formulae 109 below:
Formulae 109
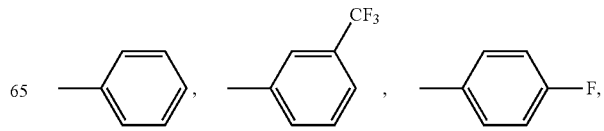

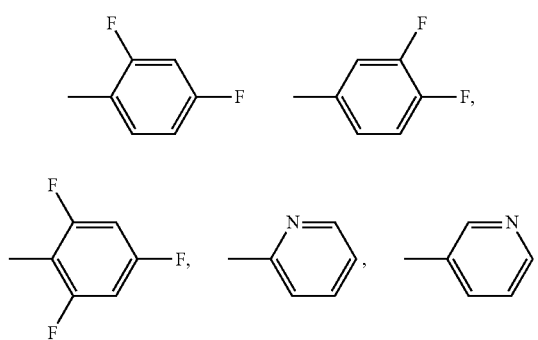
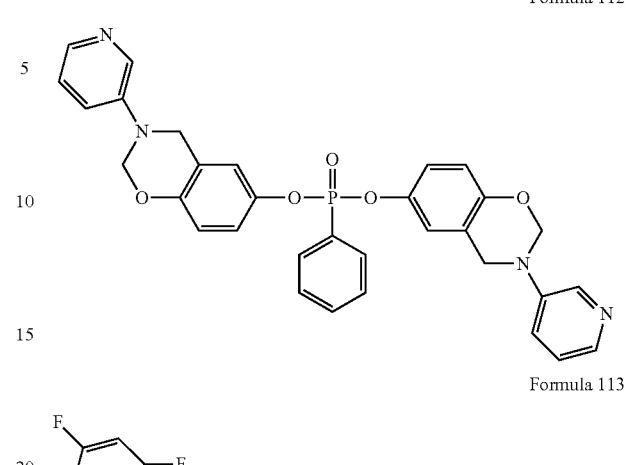
Formula 110
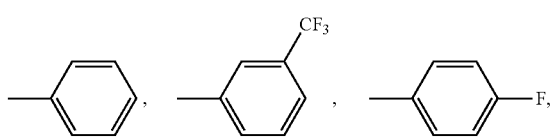
In Formula 110, $R_{17}'$ is a $C_6$-$C_{10}$ aryl group; and $R_{19}'$ is selected from the groups represented by Formula 111 below:
Formulae 111
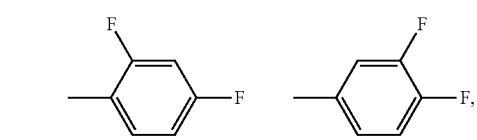
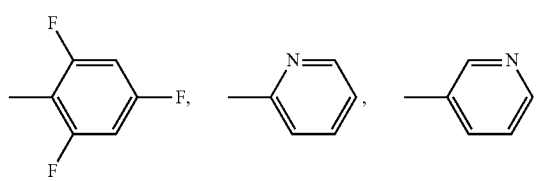
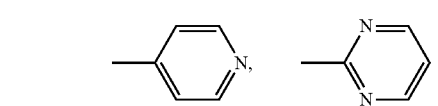
The compound of Formula 5 may be selected from the compounds represented by Formulae 112-118 below:
Formula 112
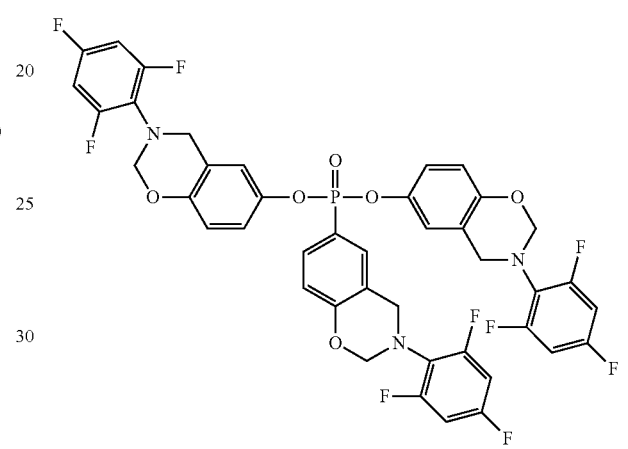
Formula 113
Formula 114
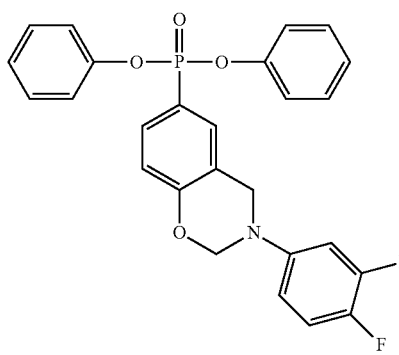
Formula 115
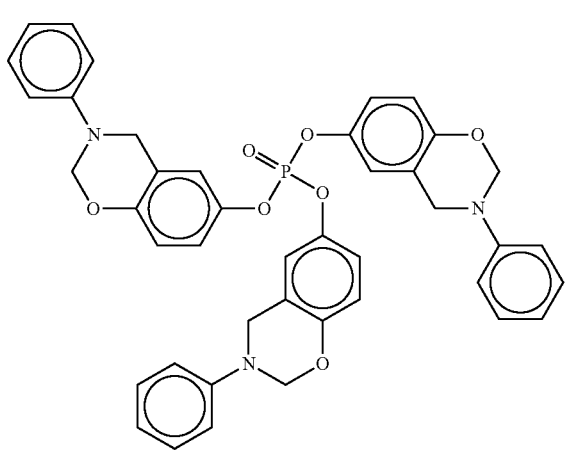

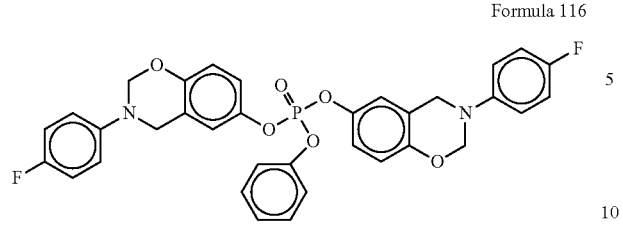
Formula 116
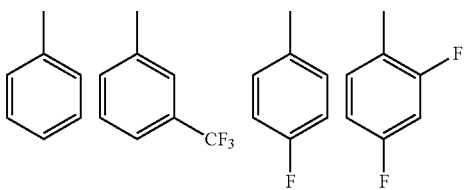
Formulae 122
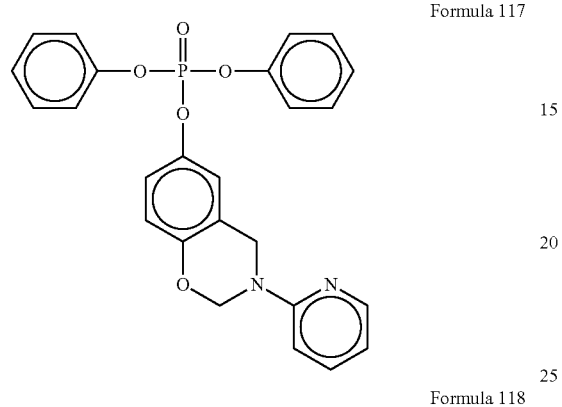
Formula 117
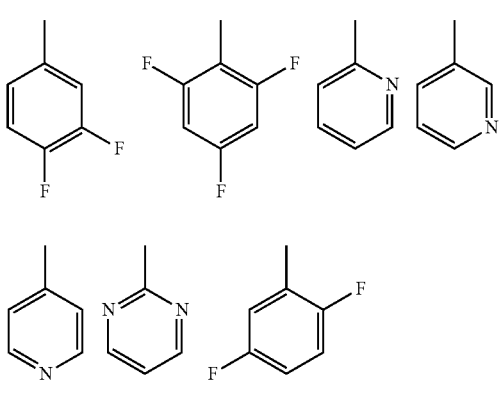
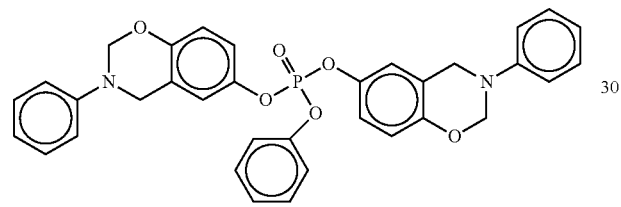
Formula 118
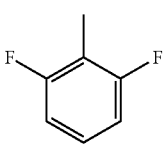
Examples of the compound of Formula 6 include compounds represented by Formulae 123-130 below:
Examples of the compound of Formula 6 include compounds represented by Formulae 119-121 below.
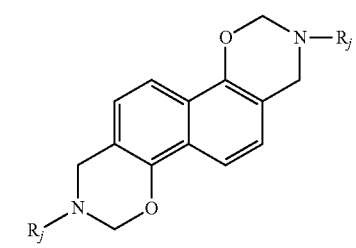
Formula 119
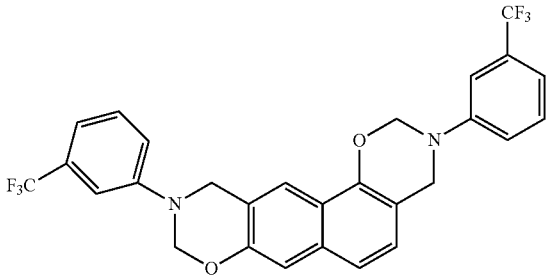
Formula 123
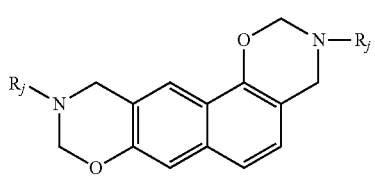
Formula 120
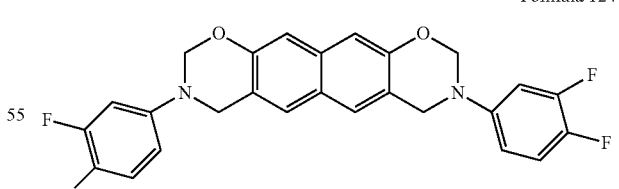
Formula 124
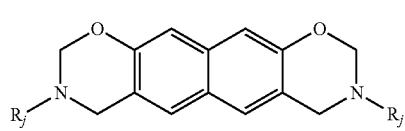
Formula 121
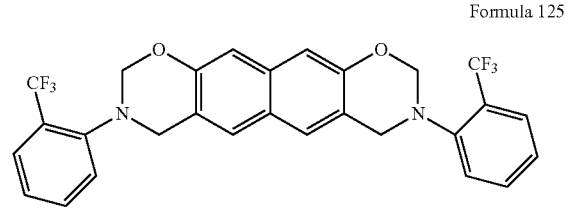
Formula 125
In Formulae 119-121, $R_j$ is selected from the groups represented by Formulae 122 below.

Formula 126
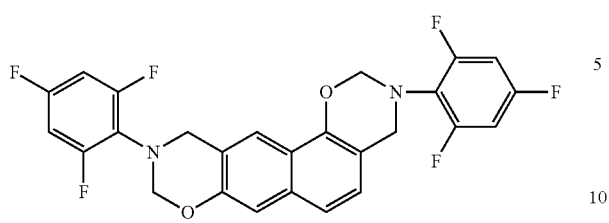

Formula 127
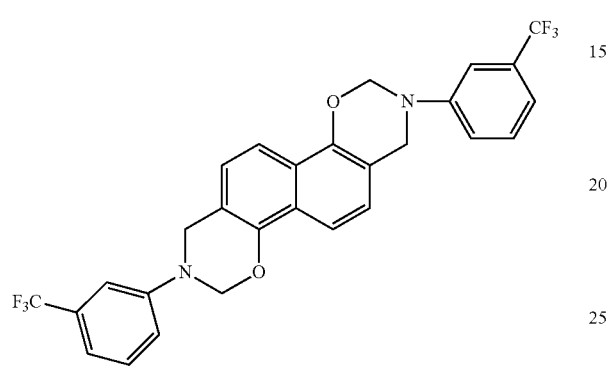

Formula 128
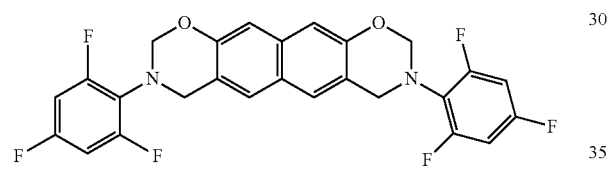

Formula 129
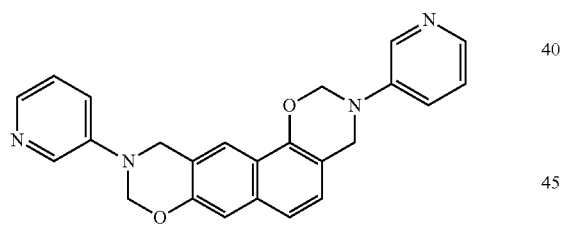

Formula 130
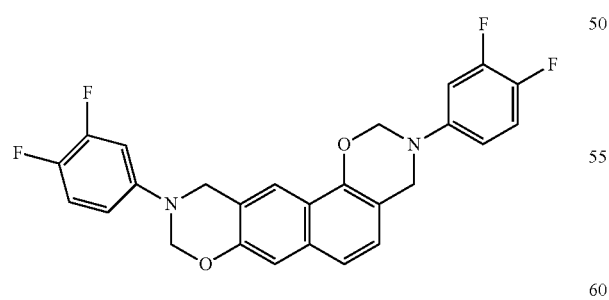

The polyoxazine-based compound in the composition may include at least one compound selected from among the compound of Formula 16 below, the compound (3,4-FPh4FA) of Formula 28, the compound of Formula 66 below, the compound of Formula 62 below, the compound of Formula 89 below, and the compound (PPO) of Formula 115 below.

Formula 16
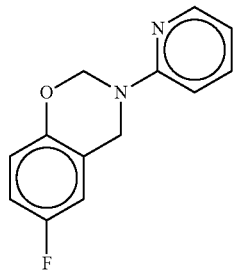

Formula 28
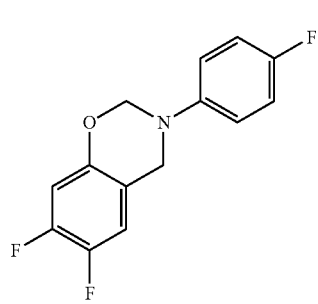

Formula 66
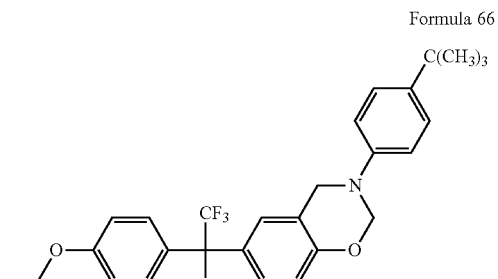

Formula 62
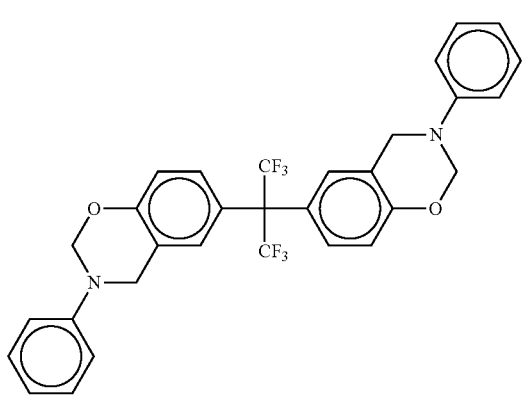

Formula 89
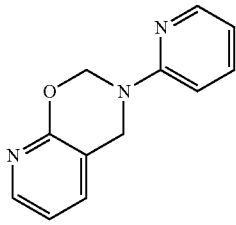

Formula 115

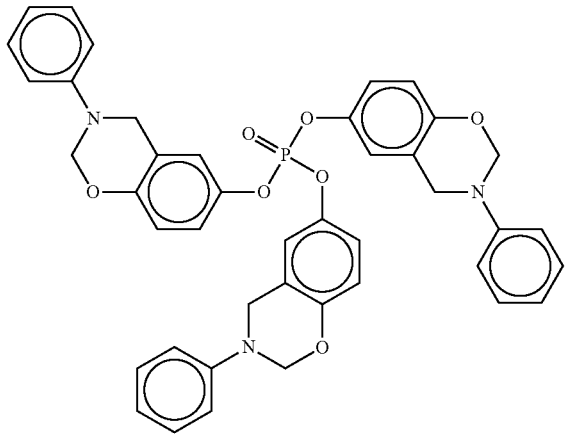

Another aspect of the present invention includes an electrode including a catalyst layer containing a coated product of the above-described composition.

The term "coated product of the composition" indicates a product from coating the polyoxazine-based compound composition or a product from coating and thermally treating the polyoxazine-based compound composition. The coated product may be the pure polyoxazine-based compound, not containing the dispersion medium that is removed from the polyoxazine-based compound composition, or a cured product of the polyoxazine-based compound according to the temperature of coating and/or thermal treatment.

Hereinafter, a method of manufacturing an electrode by using the composition will be described.

The electrode may be used, for example, in a fuel cell.

The composition, a catalyst and a solvent are mixed to prepare a composition for forming an electrode catalyst layer.

Examples of the solvent include N-methylpyrrolidone (NMP), N,N-dimethylacetamide (DMAc), water, an acid, and the like. The amount of at least one of the compound of Formula 1 and the compound of Formula 2 may be in the range of about 0.001 to about 0.5 parts by weight based on 1 part by weight of the catalyst. The amount of at least one of the compound of Formula 1 and the compound of Formula 2 may be in the range of about 0.001 to about 0.1 parts by weight based on 1 part by weight of the catalyst. When the amount of the at least one of the compound of Formula 1 and the compound of Formula 2 is within this range, the electrode catalyst layer may have strong binding force to the support.

The catalyst may be platinum (Pt), or an alloy or mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). In this regard, the Pt, the alloy, or the mixture may be supported on a carbonaceous support.

Next, the composition for forming the electrode catalyst layer is coated on a support and dried to form the electrode catalyst layer, thereby completing the manufacture of the electrode of a fuel cell.

The amount of the polyoxazine-based compound in the composition may be in the range of about 0.001 to about 20 parts by weight based on 1 part by weight of the catalyst. When the amount of the polyoxazine-based compound is within this range, the electrode catalyst layer may have strong binding force to the support.

The support may be fixed on a glass substrate to facilitate the coating. The method of coating the composition for forming the electrode catalyst layer is not particularly limited. Examples of the coating method include coating using a doctor blade, bar coating, screen printing, and the like.

After coating the composition for forming the electrode catalyst layer on the surface of the carbon support, the resultant structure is dried at a temperature of from about 20 to about 150° C. to remove the solvent. The drying time may vary according to the drying temperature, and may be in the range of about 10 to about 60 minutes.

Furthermore, the electrode may be impregnated with an acid.

The composition for forming the electrode catalyst layer may further include a cross-linkable compound.

The cross-linkable compound may be any compound having a functional group that is cross-linkable with at least one of the compound of Formula 1 and the compound of Formula 2.

For example, the cross-linkable compound may be any nitrogen-containing aromatic compound. Non-limiting examples of the cross-linkable compound include a five-membered cyclic nitrogen-containing aromatic compound, and a six-membered cyclic nitrogen-containing aromatic compound, for example, polypyrimidine.

The cross-linkable compound may be at least one polymer selected from the group consisting of polyazoles, polyimides, and polyoxazoles.

The amount of the cross-linkable compound may be in the range of about 10 to about 500 parts by weight based on 100 parts by weight of the polyoxazine-based compound. When the amount of the cross-linkable compound is within this range, the resulting electrode may have good resistance to heat and good ability to retain phosphoric acid.

When a polyazole-based material is used as the cross-linkable compound, a final product may be a graft copolymer obtained through graft polymerization of a polymer of at least one selected from among the compound of Formula 1 and the compound of Formula 1, and the polyazole-based material.

As used herein, the term "a product of polymerization of at least one selected from among the compound of Formula 1 and the compound of Formula 2, and a polyazole-based material" may be used to indicate a product of polymerization of at least one of the compounds of Formulae 1 and 2 and a polyazole-based material, or the graft copolymer described above.

The polyazole-based material is a polymer having a repeating unit including at least one aryl ring having at least one nitrogen atom. The aryl ring may be a five-membered or six-membered atom ring with one to three nitrogen atoms which may be fused to another ring, for example, another aryl ring or heteroaryl ring. In this regard, the nitrogen atoms may be substituted with an oxygen, phosphorus and/or sulfur atom. Non-limiting examples of the aryl ring include hexahydroindyl, indanyl, and tetrahydronaphthyl.

The polyazole-based material may have at least one amino group in the repeating group described above. In this regard, the at least one amino group may be a primary, secondary or tertiary amino group which is either part of the aryl ring or part of a substituent on the aryl unit.

The term "amino" includes compounds wherein a nitrogen atom is covalently bonded to at least one carbon or heteroatom. The term "amino" also includes —NH$_2$ and also includes substituted moieties.

The term also includes "alkyl amino" wherein the nitrogen is bound to at least one additional alkyl group. The term also includes "arylamino" and "diarylamino" groups wherein the nitrogen is bound to at least one or two independently selected aryl groups, respectively.

Methods of preparing the polyazole-based material and a polymer film including the polyazole-based material are disclosed in US 2005/256296A.

The polyazole-based material may include an azole unit represented by Formulae 131-144 below.

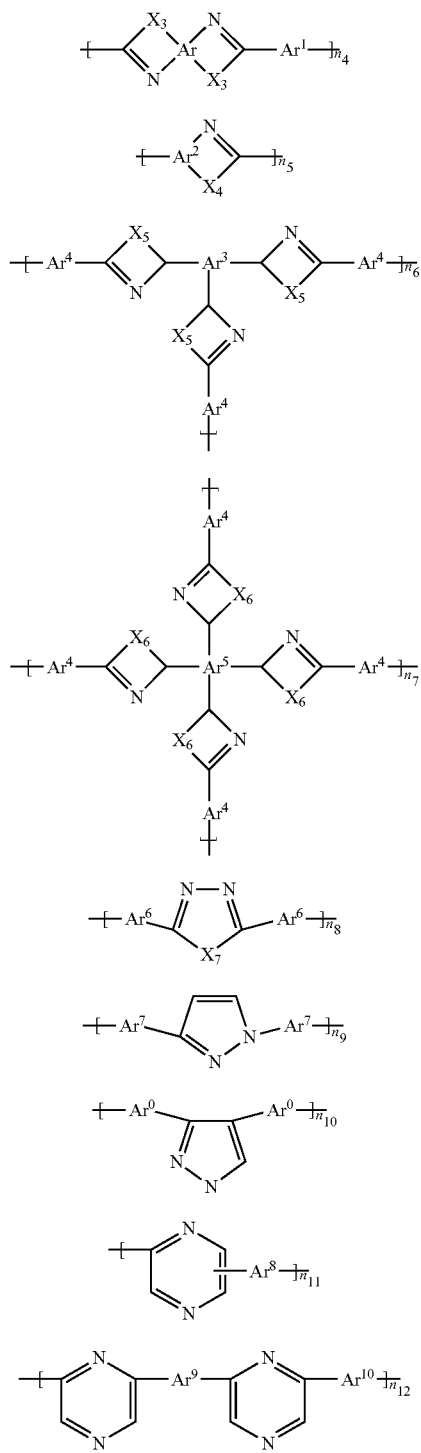

In Formulae 131-144, $Ar^0$ may be identical to or different from another $Ar^0$, or any other $Ar^n$ (where n can be no superscript or 1 to 11), and may be a divalent monocyclic or multicyclic $C_6$-$C_{20}$ aryl group or $C_2$-$C_{20}$ heteroaryl group.

Ar may be identical to or different from another Ar, or any other $Ar^n$ (where n can be no superscript or 1 to 11), and may be a tetravalent monocyclic or multicyclic $C_6$-$C_{20}$ aryl group or $C_2$-$C_{20}$ heteroaryl group; $Ar^1$ may be identical to or different from each other, and may be a bivalent monocyclic or multicyclic $C_6$-$C_{20}$ aryl group or $C_2$-$C_{20}$ heteroaryl group.

$Ar^2$ may be identical to or different from another $Ar^2$, or any other $Ar^n$ (where n can be no superscript or 1 to 11), and may be a bivalent or trivalent monocyclic or multicyclic $C_6$-$C_{20}$ aryl group or $C_2$-$C_{20}$ heteroaryl group.

$Ar^3$ may be identical to or different from another $Ar^3$, or any other $Ar^n$ (where n can be no superscript or 1 to 11), and may be a trivalent monocyclic or multicyclic $C_6$-$C_{20}$ aryl group or $C_2$-$C_{20}$ heteroaryl group.

$Ar^4$ may be identical to or different from another $Ar^4$, or any other $Ar^n$ (where n can be no superscript or 1 to 11), and may be a trivalent monocyclic or multicyclic $C_6$-$C_{20}$ aryl group or $C_2$-$C_{20}$ heteroaryl group.

$Ar^5$ may be identical to or different from another $Ar^5$, or any other $Ar^n$ (where n can be no superscript or 1 to 11), and may be a tetravalent monocyclic or multicyclic $C_6$-$C_{20}$ aryl group or $C_2$-$C_{20}$ heteroaryl group.

$Ar^6$ may be identical to or different from another $Ar^6$, or any other $Ar^n$ (where n can be no superscript or 1 to 11), and may be a bivalent monocyclic or multicyclic $C_6$-$C_{20}$ aryl group or $C_2$-$C_{20}$ heteroaryl group.

$Ar^7$ may be identical to or different from another $Ar^7$, or any other $Ar^n$ (where n can be no superscript or 1 to 11), and may be a bivalent monocyclic or multicyclic $C_6$-$C_{20}$ aryl group or $C_2$-$C_{20}$ heteroaryl group.

$Ar^8$ may be identical to or different from another $Ar^8$, or any other $Ar^n$ (where n can be no superscript or 1 to 11), and may be a trivalent monocyclic or multicyclic $C_6$-$C_{20}$ aryl group or $C_2$-$C_{20}$ heteroaryl group.

$Ar^9$ may be identical to or different from another $Ar^9$, or any other $Ar^n$ (where n can be no superscript or 1 to 11), and may be a bivalent, trivalent or tetravalent monocyclic or multicyclic $C_6$-$C_{20}$ aryl group or $C_2$-$C_{20}$ heteroaryl group.

$Ar^{10}$ may be identical to or different from another $Ar^{19}$, or any other $Ar^n$ (where n can be no superscript or 1 to 11), and may be a bivalent or trivalent monocyclic or multicyclic $C_6$-$C_{20}$ aryl group or $C_2$-$C_{20}$ heteroaryl group.

$Ar^{11}$ may be identical to or different from another $Ar^{11}$, or any other $Ar^n$ (where n can be no superscript or 1 to 11), and may be a bivalent monocyclic or multicyclic $C_6$-$C_{20}$ aryl group or $C_2$-$C_{20}$ heteroaryl group.

$X_3$ to $X_{11}$ may be identical to or different from another $X_n$, or any other $X_n$ (where n can be 3 to 11), and may be an oxygen atom, a sulfur atom or —N(R'); and R' may be a hydrogen atom, a $C_1$-$C_{20}$ alkyl group, a $C_1$-$C_{20}$ alkoxy group or a $C_6$-$C_{20}$ aryl group.

$R_9$ may be a hydrogen atom, a $C_1$-$C_{20}$ alkyl group or a $C_6$-$C_{20}$ aryl group.

$n_0$, $n_4$-$n_{16}$, and $m_2$ are each, independently, an integer of about 10 or greater, and in other embodiments, may each be an integer of about 100 or greater, for example, in the range of about 100 to about 100,000.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene, wherein these aryl or heteroaryl groups may have a substituent.

$Ar^0$, $Ar^1$, $Ar^4$, $Ar^6$, $Ar^7$, $Ar^8$, $Ar^9$, $Ar^{10}$, and $Ar^{11}$ defined above may have any substitutable pattern. For example, if $Ar^0$, $Ar^1$, $Ar^4$, $Ar^6$, $Ar^7$, $Ar^8$, $Ar^9$, $Ar^{10}$, and $Ar^{11}$ are phenylene, $Ar^0$, $Ar^1$, $Ar^4$, $Ar^6$, $Ar^7$, $Ar^8$, $Ar^9$, $Ar^{10}$ and $Ar^{11}$ may be ortho-phenylene, meta-phenylene or para-phenylene.

The alkyl group may be a $C_1$-$C_4$ short-chain alkyl group, such as methyl, ethyl, n-propyl, i-propyl or t-butyl. The aryl group may be, for example, a phenyl group or a naphthyl group.

Examples of the substituent include a halogen atom, such as fluorine, an amino group, a hydroxyl group, and a short-chain alkyl group, such as methyl or ethyl.

Examples of the polyazole-based material include polyimidazole, polybenzothiazole, polybenzoxazole, polyoxadiazole, polyquinoxaline, polythiadiazole, polypyridine, polypyrimidine, and polytetrazapyrene.

The polyazole-based material may be a copolymer or blend including at least two units selected from the group consisting of units represented by Formulae 131-144 above. The polyazole-based material may be a block copolymer (di-block or tri-block), a random copolymer, a periodic copolymer or an alternating polymer including at least two units selected from the units of Formulae 131-144.

A polyazole-based material including at least one of the units of Formulae 131 and 132 may be used.

Non-limiting examples of the polyazole-based material include polymers represented by Formulae 145-171 below:

Formula 145

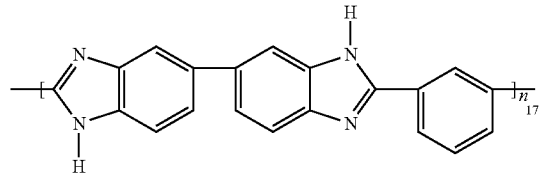

Formula 146

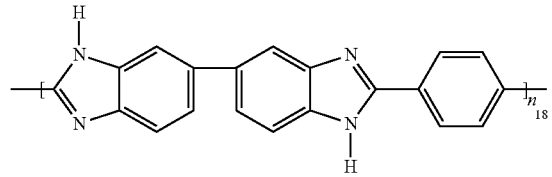

Formula 147

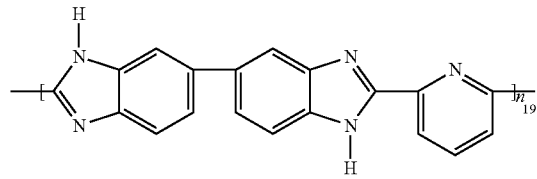

Formual 148

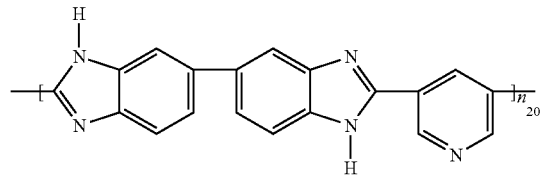

Formula 149

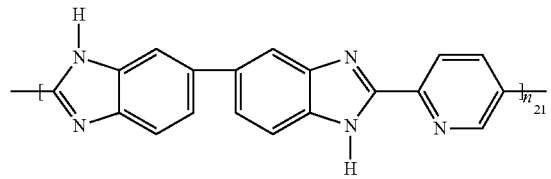

Formula 150

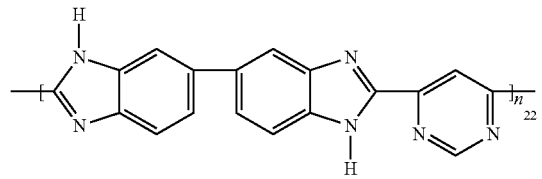

Formula 151
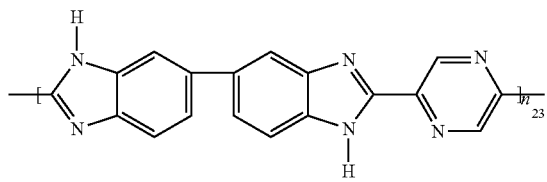
Formula 152
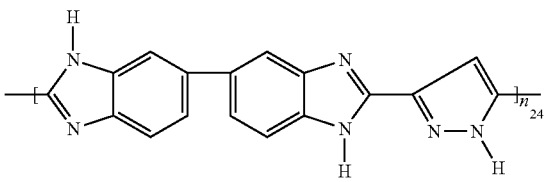
Formula 153
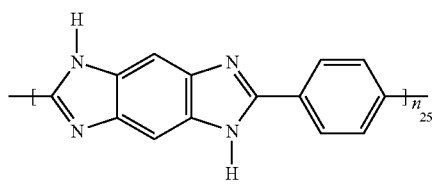
Formula 154
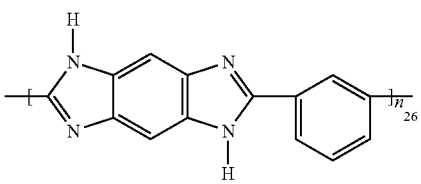
Formula 155
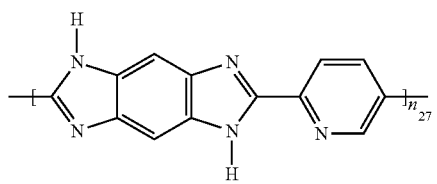
Formula 156
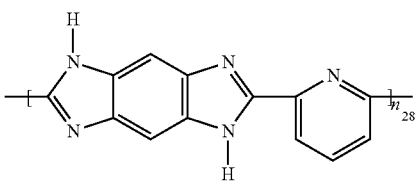
Formula 157
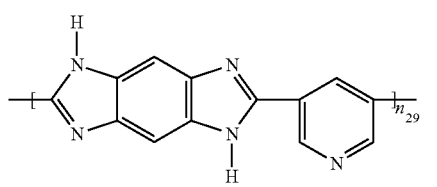
Fromula 158
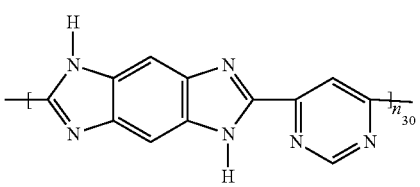
Formula 159
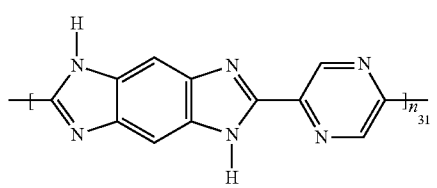
Formula 160
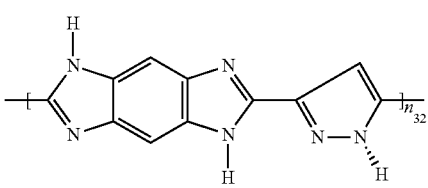
Formula 161
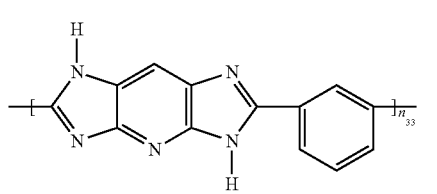
Formula 162
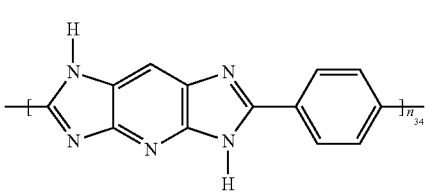
Formula 163
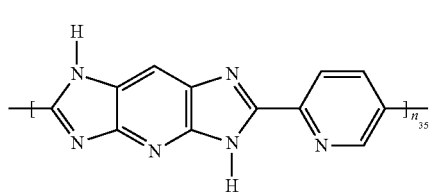
Formula 164
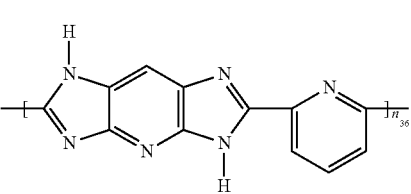
Formula 165
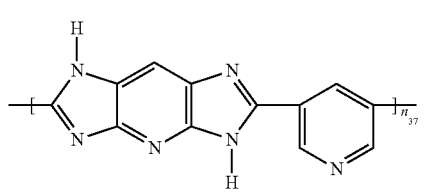
Formula 166
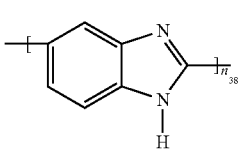

Formula 167
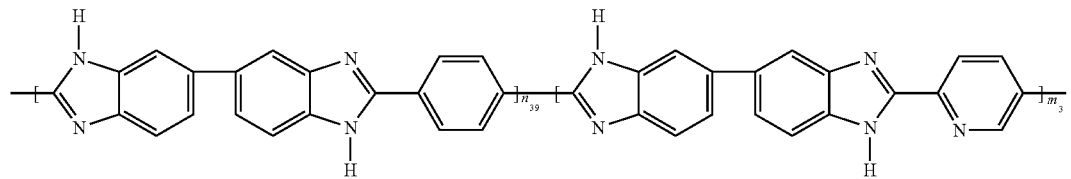

Formula 168
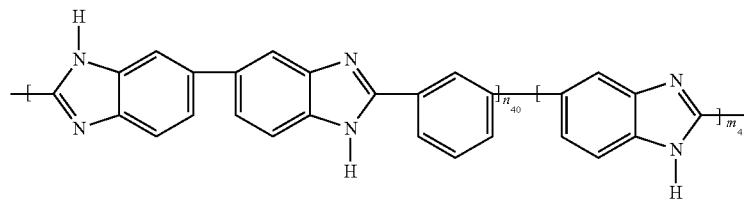

Formula 169
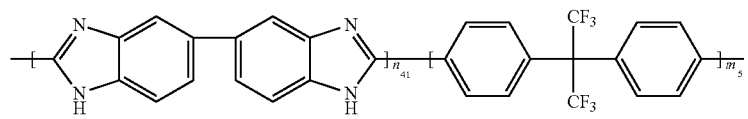

Formula 170
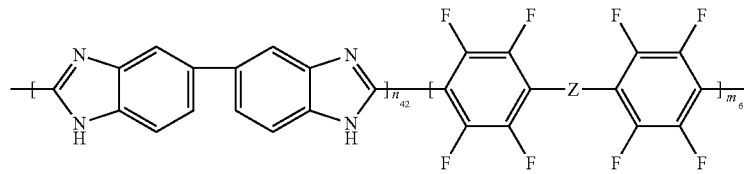

Formula 171
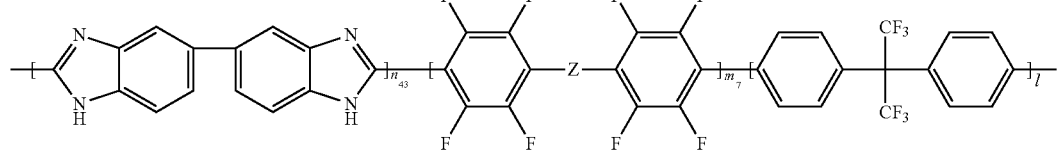

In Formulae 145-171 above, I, $n_{17}$-$n_{43}$, and $m_3$-$m_7$ are each independently an integer of about 10 or greater, and in some embodiments, may each be, independently, an integer of about 100 or greater.

z may be a chemical bond, —($CH_2$)$_s$—, —C(=O)—, —$SO_2$—, —C($CH_3$)$_2$—, or —C($CF_3$)$_2$— where may be an integer from about 1 to 5.

The polyazole-based material may be a compound (m-polybenzimidazole, m-PBI) represented by Formula 172 below, or compound (p-PBI) represented by Formula 173 below.

Formula 172
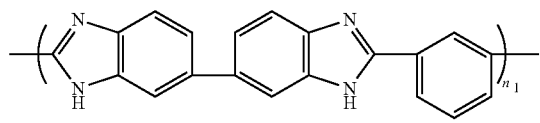

In Formula 172, $n_1$ is an integer of about 10 or greater.

Formula 173
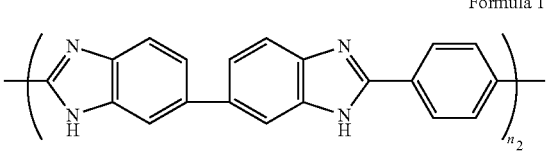

In Formula 173, $n_2$ is an integer of about 10 or greater.

The polymers of Formulae 172 and 173 may have a number average molecular weight of about 1,000,000 or less.

For example, the polyazole-based material may be a benzimidazole-based polymer represented by Formula 174 below.

Formula 174
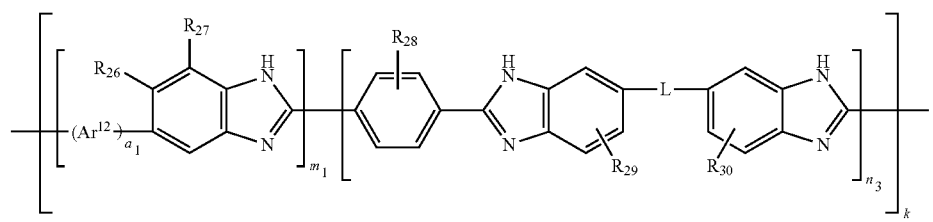

In Formula 174, $R_{26}$, and $R_{27}$ are each, independently, a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_{26}$ and $R_{27}$ may be linked to form a $C_4$-$C_{20}$ carbocyclic ring or a $C_3$-$C_{20}$ hetero ring.

$Ar^{12}$ is a substituted or unsubstituted $C_6$-$C_{20}$ aryl group or a substituted or unsubstituted $C_3$-$C_{20}$ heteroaryl group.

$R_{28}$ to $R_{30}$ are each independently a mono- or a multi-substituted substituent selected from the group consisting of a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, and an unsubstituted or substituted $C_3$-$C_{20}$ heteroaryloxy group.

L represents a linker.

$m_1$ is a number from 0.01 to 1.

$a_1$ is 0 or 1.

$n_3$ is a number from 0 to 0.99.

k is a number from about 10 to 250.

The benzimidazole-based polymer may be a compound represented by Formula 175 below or a compound represented by Formula 176 below:

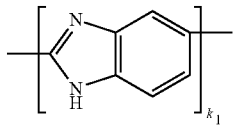

Formula 175

In Formula 175, $k_1$, which represents a degree of polymerization, may be a number from about 10 to 300.

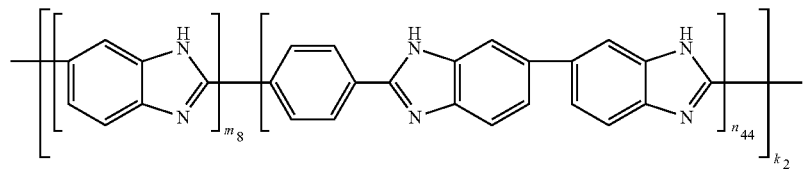

Formula 176

In Formula 176, $m_8$ is a number from 0.01 to 1, for example, 1 or a number from 0.1 to 0.9; and $n_{44}$ is a number from 0 to 0.99, for example, 0 or a number from 0.1 to 0.9; and $k_2$ is a number from about 10 to 250.

The electrode of the fuel cell manufactured as described above is combined with an electrolyte membrane to form a membrane-electrode assembly (MEA).

A unit cell is manufactured using the MEA, and air and hydrogen fuel are injected into the unit cell to operate the fuel cell. The operating temperature of the fuel cell may be, for example, in the range of about 150 to about 180° C.

Any electrolyte membrane that is commonly used in fuel cells may be used. For example, a polybenzimidazole electrolyte membrane, a polybenzoxazine-polybenzimidazole copolymer electrolyte membrane, a porous polytetrafluoroethylene (PTFE) membrane, or the like may be used. In a similar way to the electrode, the electrolyte membrane may include the polymer obtained from polymerization of the composition including at least one oxazine-based monomer selected from the compounds of Formulae 1 and 2.

The electrolyte membrane may further be impregnated with a proton conductor. Examples of the proton conductor include polyphosphoric acid, phosphonic acid ($H_3PO_3$), ortho-phosphoric acid ($H_3PO_4$), pyro-phosphoric acid ($H_4P_2O_7$), triphosphoric acid ($H_5P_3O_{10}$), meta-phosphoric acid, and a derivative thereof. The concentration of the proton conductor may be at least 80 wt %, 90 wt %, 95 wt %, or 98 wt %.

The electrolyte membrane may be prepared using a polymerization product of one or two different kinds of oxazine-based monomers according to a method disclosed in Korean Patent Publication No. 2009-0045655.

Substituents in the formulae above may be defined as follows.

As used herein, the term "alkyl" refers to a fully saturated branched or unbranched (or straight chain or linear) hydrocarbon moiety.

Examples of the alkyl group used herein include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$ and $CCl_3$), a $C_1$-$C_{20}$ alkoxy, a $C_2$-$C_{20}$ alkoxyalkyl, a hydroxy group, a nitro group, a cyano group, an amino group, an amidino group, a hydrazine, a hydrazone, a carboxyl group or a salt thereof, a sulfonyl group, a sulfamoyl, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

As used herein, the term "halogen atom" refers to fluoro, bromo, chloro, or iodo.

As used herein, the term "a $C_1$-$C_{20}$ alkyl group substituted with a halogen atom" refers to a $C_1$-$C_{20}$ alkyl group that is substituted with one or more halo groups, and unlimited examples of a $C_1$-$C_{20}$ alkyl group that is substituted with one or more halo groups are monohaloalkyl, dihaloalkyl, and polyhaloalkyl including perhaloalkyl.

A monohaloalkyl has one iodo, bromo, chloro or fluoro within the alkyl group, and dihaloalkyl and polyhaloalkyl groups have two or more of the same halo atoms or a combination of different halo groups within the alkyl.

As used herein, the term "alkoxy" refers to alkyl-O—, wherein alkyl is defined herein above. Examples of alkoxy include, but are not limited to, methoxy, ethoxy, propoxy, 2-propoxy, butoxy, tert-butoxy, pentyloxy, hexyloxy, cyclopropyloxy-, cyclohexyloxy- and the like. At least one hydrogen atom of the alkoxy group may be substituted with the same substituent as described above in connection with the alkyl group.

The term "alkoxyalkyl" refers to an alkyl group, as defined above, in which the alkyl group is substituted with alkoxy. At least one hydrogen atom of the alkoxyalkyl group may be substituted with the same substituent as described above in connection with the alkyl group. The term alkoxyalkyl includes a substituted alkoxyalkyl moiety.

The term "alkenyl" refers to a branched or unbranched hydrocarbon having at least one carbon-carbon double bond. Examples of alkenyl are, but are not limited to, vinyl, allyl, butenyl, isopropenyl or isobutenyl. At least one hydrogen atom of the alkenyl group may be substituted with the same substituent as described above in connection with the alkyl group.

The term "alkynyl" refers to a branched or unbranched hydrocarbon having at least one carbon-carbon triple bond. Examples of alkynyl are but are not limited to, ethynyl, butynyl, isobutynyl or isopropynyl.

At least one hydrogen atom of alkynyl may be substituted with the same substituent as described above in connection with the alkyl group.

The term "aryl" is used alone or in combination, and refers to an aromatic hydrocarbon group having one or more rings.

The term "aryl" also refers to a group in which an aromatic ring is fused to one or more cycloalkyl rings.

Examples of aryl are, but are not limited to, phenyl, naphthyl, or tetrahydronaphthyl.

At least one hydrogen atom of aryl may be substituted with the same substituent as described above in connection with the alkyl group.

The term "arylalkyl" is an alkyl substituted with aryl. Examples of arylalkyl are benzyl or Phenyl-$CH_2CH_2$—.

The term "aryloxy" includes an —O-aryl, wherein aryl is defined herein. Examples of aryloxy are phenoxy and the like. At least one hydrogen atom of aryloxy may be substituted with the same substituent as described above in connection with the alkyl group.

The term "heteroaryl" refers to a monocyclic or bicyclic organic compound that contains one or more hetero atoms selected from N, O, P, and S, and the remaining ring atoms are carton atoms. The heteroaryl may include, for example, 1 to 5 hetero atoms, and 5 to 10 ring members.

S or N may be oxidized to various oxidation states.

Typical monocyclic heteroaryl groups include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2yl, pyrazin-4-yl, pyrazin-5-yl, 2-pyrimidin-2-yl, 4-pyrimidin-2-yl, and 5-pyrimidin-2-yl.

The term "heteroaryl" also refer to a group in which a heteroaromatic ring is fused to one or more aryl, cycloaliphatic, or heterocyclic rings.

Examples of bicyclic heteroaryl are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom in the heteroaryl group may be substituted with the same substituent as described above in connection with the alkyl group.

The term "heteroarylakyl" refers to alkyl substituted with heteroaryl.

The term "heteroaryloxy" includes an —O-heteroaryl moiety. At least one hydrogen atom in heteroaryloxy may be substituted with the same substituent as described above in connection with the alkyl group.

The term "heterayloxyalkyl" refers to an alkyl group that is substituted with heteroaryloxy. At least one hydrogen atom in heteraryloxyalkyl may be substituted with the same substituent as described above in connection with the alkyl group.

As used herein, the term "carbocyclic" refers to saturated or partially unsaturated but non-aromatic monocyclic, bicyclic or tricyclic hydrocarbon groups.

Exemplary monocyclic hydrocarbon groups include cyclopentyl, cyclopentenyl, cyclohexyl and cyclohexenyl.

Exemplary bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl.

Exemplary tricyclic hydrocarbon groups include adamantyl.

At least one hydrogen atom in carbocyclic may be substituted with the same substituent as described above in connection with the alkyl group.

The term "heterocyclic" refers to a ring containing 5-10 ring atoms including a hetero atom such as N, S, P, or O, and an example of heterocyclic is pyridyl. At least one hydrogen atom in heterocyclic may be substituted with the same substituent as described above in connection with the alkyl group.

The term "heterocyclicoxy" includes an —O-heterocyclic, and at least one hydrogen atom in heterocyclicoxy may be substituted with the same substituent as described above in connection with the alkyl group.

The term "sulfonyl" includes R"—$SO_2$—, wherein R" is hydrogen, alkyl, aryl, heteroaryl, aryl-alkyl, heteroaryl-alkyl, alkoxy, aryloxy, cycloalkyl, or heterocyclic.

The term "sulfamoyl" includes $H_2NS(O)_2$—, alkyl-NHS$(O)_2$—, (alkyl)$_2$NS$(O)_2$—, aryl-NHS$(O)_2$—, alkyl(aryl)-NS$(O)_2$—, (aryl)$_2$NS$(O)_2$—, heteroaryl-NHS$(O)_2$—, (aryl-alkyl)-NHS$(O)_2$—, or (heteroaryl-alkyl)-NHS$(O)_2$—.

At least one hydrogen atom in sulfamoyl may be substituted with the same substituent as described above in connection with the alkyl group.

The term "amino" includes compounds wherein a nitrogen atom is covalently bonded to at least one carbon or heteroatom. The term "amino" also includes —$NH_2$ and also includes substituted moieties.

The term also includes "alkylamino" wherein the nitrogen is bound to at least one additional alkyl group. The term also includes "arylamino" and "diarylamino" groups wherein the nitrogen is bound to at least one or two independently selected aryl groups, respectively.

The term "alkylene", "alkenylene", "alkynylene", "arylene", and "heteroarylene" are defined as described above, except that "alkyl", "alkenyl" "alkynyl", "aryl", and "heteroaryl", which are mono-valent groups, are changed into divalent groups.

At least one hydrogen atom in "alkylene", "alkenylene", "alkynylene", "arylene", and "heteroarylene" may be substituted with the same substituent as described above in connection with the alkyl group.

Hereinafter, one or more embodiments of the present invention will be described in detail with reference to the following examples. These examples are not intended to limit the purpose and scope of the one or more embodiments of the present invention.

Example 1

Preparation of Polybenzoxazine-Based Compound Composition Using the Compound of Formula 16

200 g of a 85 wt % phosphoric acid was added to 2 g of the compound of Formula 16 and mixed at 80° C. for 1 hour to obtain a solution of the compound of Formula 16 in phosphoric acid. The solution was thermally treated at 160° C. for polymerization.

The polymerization product was centrifuged to remove the phosphoric acid. The remaining centrifuged product was washed with water, and water was added thereto to obtain a polybenzoxazine-based compound composition including about 3.4 wt % of polybenzoxazine-based compound particles.

The particle diameter of the polybenzoxazine-based compound in the composition of Example 1 was measured using an optical microscope (ZEISS). The results are shown in FIG. 1.

Referring to FIG. 1, the polybenzoxazine-based compound was found to have a particle diameter of about 1 μm.

Example 2

Preparation of Polybenzoxazine-Based Compound Composition Using the Compound of Formula 62

200 g of a 85 wt % phosphoric acid was added to 1 g of the compound (HF-a) of Formula 62 and mixed at 80° C. for 1 hour to obtain a solution of the compound of Formula 62 in phosphoric acid. The solution was thermally treated at 180° C. for 24 hours for polymerization.

The polymerization product was centrifuged to remove the phosphoric acid. The remaining centrifuged product was washed with water, and water was added thereto to obtain a polybenzoxazine-based compound composition including about 3.4 wt % of polybenzoxazine-based compound particles. The polybenzoxazine-based compound in the composition was found to have a particle diameter of about 1 μm.

Example 3

Preparation of Polybenzoxazine-Based Compound Composition Using the Compound of Formula 28

200 g of a 85 wt % phosphoric acid was added to 2 g of the compound of Formula 28 and mixed at 80° C. for 1 hour to obtain a solution of the compound of Formula 28 in phosphoric acid. The solution was thermally treated at 160° C. for 3 hours for polymerization.

The polymerization product was centrifuged to remove the phosphoric acid. The remaining centrifuged product was washed with water, and water was added thereto to obtain a polybenzoxazine-based compound composition including about 3.4 wt % of polybenzoxazine-based compound particles. The polybenzoxazine-based compound in the composition was found to have a particle diameter of about 1 μm.

Example 4

Preparation of Polybenzoxazine-Based Compound Composition Using the Compound of Formula 89

200 g of a 85 wt % phosphoric acid was added to 2 g of the compound of Formula 89 and mixed at 80° C. for 1 hour to obtain a solution of the compound of Formula 89 in phosphoric acid. The solution was thermally treated at 180° C. for 24 hours for polymerization.

The polymerization product was centrifuged to remove the phosphoric acid. The remaining centrifuged product was washed with water, and water was added thereto to obtain a polybenzoxazine-based compound composition including about 3.4 wt % of a polybenzoxazine-based compound particles.

Thermogravimetric characteristics of the polybenzoxazine-based compounds of Example 1, 3 and 4 were evaluated using a thermogravimetric analyzer (TGA analyzer). The results are shown in FIG. 2.

Figure 2:
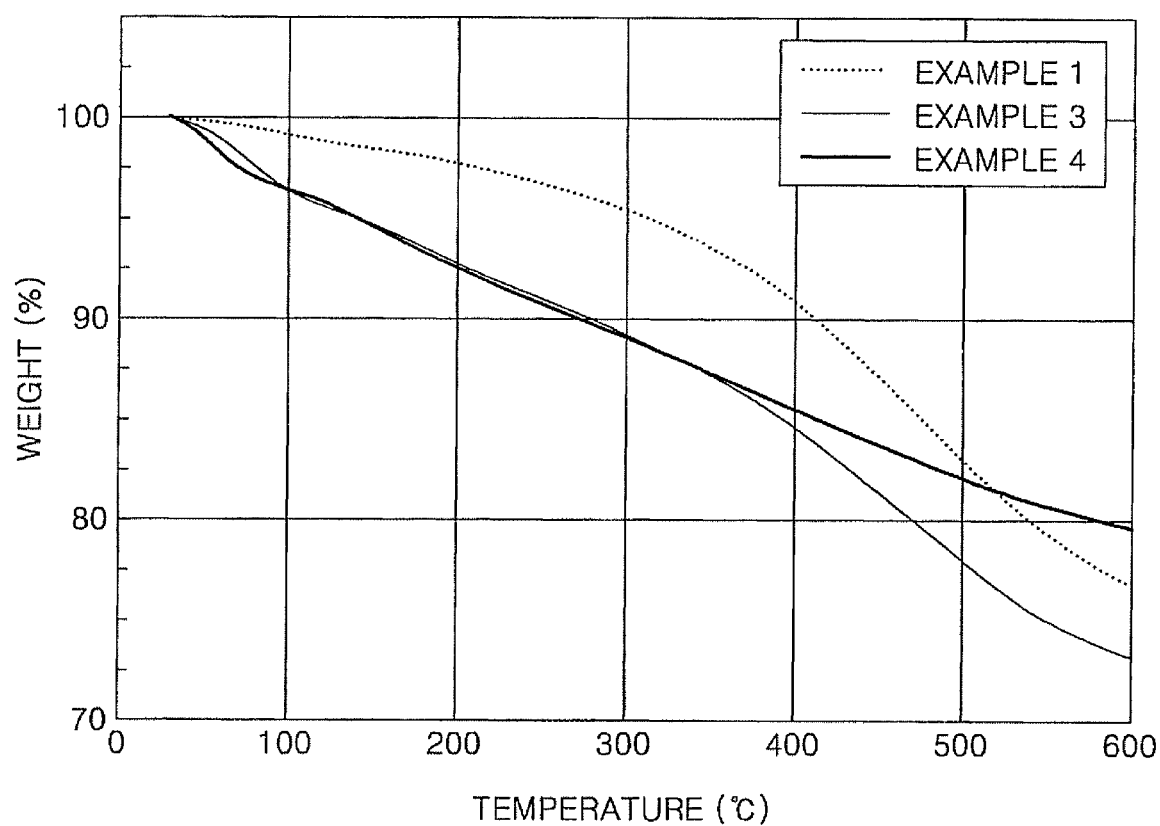
FIG. 2 is a graph illustrating, results of thermogravimetric analysis (TGA) on polybenzoxazine-based compounds of Examples 1, 3 and 4.

Referring to FIG. 2, the polybenzoxazine-based compounds of Examples 1, 3 and 4 had excellent thermal stabilities still at 300° C.

Manufacture Example 1

Manufacture of Fuel Cell

A 2 wt % polybenzoxazine-based compound composition was prepared from the polybenzoxazine-based compound composition prepared in Example 1. 0.5 g of the 2 wt % of the polybenzoxazine-based compound composition, 1 g of Pt/C, and 4 g of N-methylpyrrolidone were mixed to prepare a composition for forming a cathode catalyst layer.

The composition for forming the cathode catalyst layer was coated on a carbon paper and dried at room temperature for one hour, at 80° C. for one hour, at 120° C. for 30 minutes, and at 150° C. for 15 minutes to manufacture a cathode (fuel electrode). The loading amount of platinum (Pt) in the cathode was 1.57 mg/cm$^2$.

An anode was manufactured as follows.

2 g of a Pt catalyst (50 wt % of Pt supported on carbon) and 9 g of N-methylpyrolidone (NMP) as a solvent were put into a stirring vessel, and stirred using a high-speed stirrer for two minutes. Then, a solution of 0.05 g of polyvinylidenefluoride dissolved in 0.95 g of NMP was added to the mixture, followed by stirring for two minutes to prepare a composition for forming an anode catalyst layer. The composition for forming the anode catalyst layer was coated on carbon paper, which was coated with a microporous layer, by using a bar coater to complete the manufacture of the anode. The loading amount of Pt in the anode was 0.9 mg/cm$^2$.

Meanwhile, 50 parts by weight of a compound (PPO) represented by Formula 115 below and 50 parts by weight of polybenzimidazole (m-PBI) of Formula 172 below were blended, and cured at a temperature of about 80 to about 220° C.

Formula 115

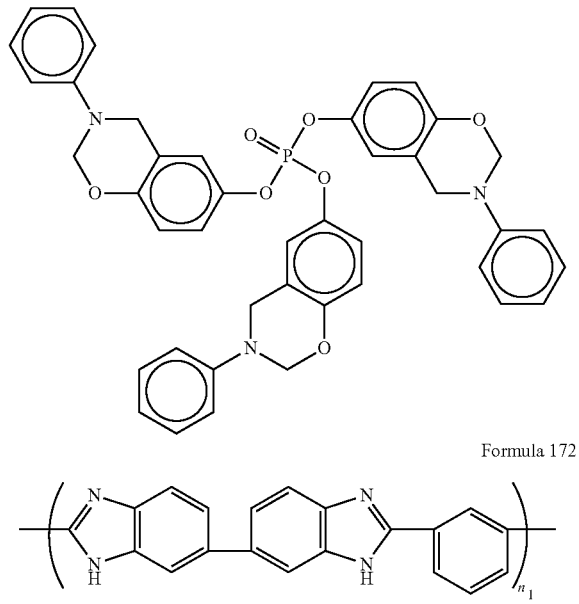

Formula 172

In Formula 172, n₁ may be about 130.

Subsequently, the resultant was impregnated with 85 wt % of phosphoric acid at 80° C. for 4 hours or longer to form an electrolyte membrane. Herein, the amount of phosphoric acid was about 500 parts by weight based on 100 parts by weight of the electrolyte membrane.

The electrolyte membrane was disposed between the cathode and the anode to manufacture a membrane-electrode assembly (MEA). The cathode and the anode were not impregnated with phosphoric acid.

To prevent gas permeation between the cathode and the anode, a PTFE membrane main-gasket having a thickness of 200 μm and a PTFE membrane sub-gasket having a thickness of 20 μm were joined and disposed between each of the anode and cathode, and the electrolyte membrane. The pressure applied to the MEA was adjusted using a torque wrench, and was stepwise increased using 1, 2, and 3 N-m Torque wrenches.

Electricity was generated by supplying hydrogen to the anode (flow rate: about 100 ccm) and air to the cathode (flow rate: about 250 ccm), at 150° C., without humidifying the electrolyte membrane, and characteristics of the fuel cell were measured. Herein, the electrolyte membrane doped with phosphoric acid was used, and thus, the performance of the fuel cell was improved over time. Thus, the fuel cell was activated until the operating voltage reached a peak voltage, and finally, the characteristics of the fuel cell were evaluated. In addition, the areas of the cathode and anode were fixed to 7.84 cm² (2.8 2.8), and the thicknesses of the cathode and the anode were about 430 μm and about 390 μm, respectively.

Manufacture Examples 2-4

Manufacture of Fuel Cell

Fuel cells were manufactured in the same manner as in Manufacture Example 1, except that the polybenzoxazine-based compound compositions of Examples 2-4, respectively, were used, instead of the polybenzoxazine-based compound composition of Example 1.

Comparative Manufacture Example 1

Manufacture of Fuel Cell

A fuel cell was manufactured in the same manner as in Manufacture Example 1, except that 0.01 g of polyvinylidenefluoride was used, instead of 0.5 g of the polybenzoxazine-based compound composition, as a binder when manufacturing the cathode and the anode, and the loading amount of Pt in the cathode was 1.51 mg/cm².

Comparative Manufacture Example 2

Manufacture of Fuel Cell 2 g of a Pt/C catalyst and 9 g of NMP as a solvent were put into a stirring vessel and stirred using a high-speed stirrer for 2 minutes. A solution of 0.05 g of 4FPh2AP dissolved in 0.5 g of NMP was added thereto and stirred further for 2 minutes.

Subsequently, a solution of 0.05 g of polyvinylidene fluoride dissolved in 0.95 g of NMP was added to the mixture and stirred further for 2 minutes to prepare a composition for forming a cathode catalyst layer.

Carbon paper was cut to a size of 47 cm², fixed on a glass plate, and coated with the composition by using a doctor blade (Sheen Instruments Ltd) with a gap of about 850 μm.

The composition for forming the cathode catalyst layer was coated on the carbon paper, which was coated with a microporous layer, by using a doctor blade and dried at room temperature for one hour, at 80 for one hour, at 120 for 30 minutes, and at 150° C. for 15 minutes to form a cathode. The loading amount of Pt in the cathode was 2.28 mg/cm².

An anode was manufactured as follows.

2 g of a Pt catalyst and 9 g of NMP as a solvent were put into a stirring vessel, and stirred using a high-speed stirrer for 2 minutes. Then, a solution of 0.05 g of polyvinylidenefluoride dissolved in 0.95 g of NMP was added to the mixture, followed by stirring for two minutes to prepare a composition for forming an anode catalyst layer. The composition for forming the anode catalyst layer was coated on a carbon paper, which was coated with a microporous layer, by using a bar coater to complete the manufacture of the anode. The loading amount of Pt in the anode was 1.4 mg/cm².

Meanwhile, 50 parts by weight of a compound (PPO) represented by Formula 115 below and 50 parts by weight of polybenzimidazole (m-PBI) of Formula 172 below were blended, and cured at a temperature of about 80 to about 220° C.

Formula 115

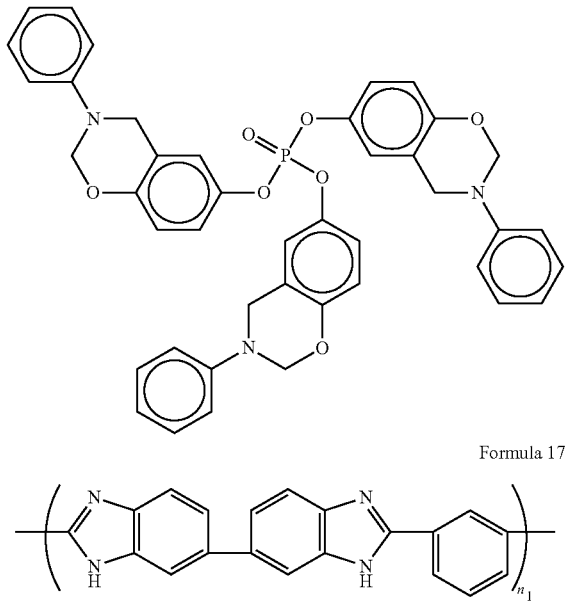

Formula 172

In Formula 172, $n_1$ may be about 130.

Subsequently, the resultant was impregnated with 85 wt % of phosphoric acid to form an electrolyte membrane. Herein, the amount of phosphoric acid was about 500 parts by weight based on 100 parts by weight of the electrolyte membrane.

The electrolyte membrane was disposed between the cathode and the anode to manufacture an MEA. The cathode and the anode were not impregnated with phosphoric acid.

To prevent gas permeation between the cathode and the anode, a PTFE membrane main-gasket having a thickness of 200 μm and a PTFE membrane sub-gasket having a thickness of 20 μm were joined and disposed between each of the anode and cathode, and the electrolyte membrane. The pressure applied to the MEA was adjusted using a torque wrench and was stepwise increased using 1, 2, and 3 N-m Torque wrenches.

Electricity was generated by supplying hydrogen to the anode (flow rate: about 100 cc/min) and air to the cathode (flow rate: about 250 cc/min), at 150° C., without humidifying the electrolyte membrane, and characteristics of the fuel cell were measured. Herein, the electrolyte membrane doped with phosphoric acid was used, and thus, the performance of the fuel cell was improved over time. Thus, the fuel cell was activated until an operating voltage reached a peak voltage, and finally, the characteristics of the fuel cell were evaluated. In addition, the areas of the cathode and the anode were fixed to 7.84 cm² (2.8×2.8). The thickness of the cathode was about 430 μm, and the thickness of the anode was about 390 μm.

Figure 3:
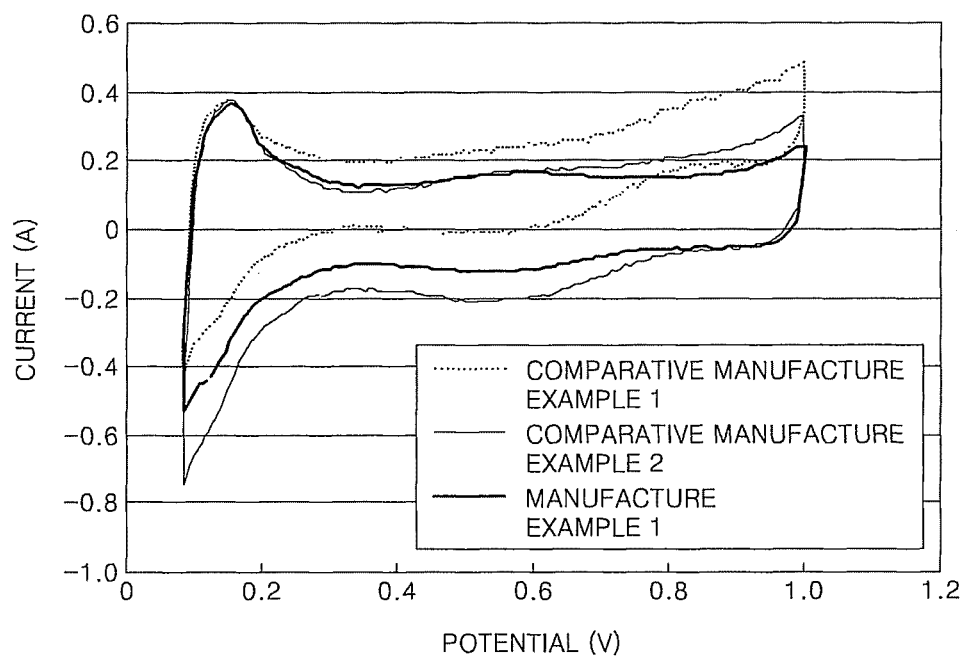
FIG. 3 is a graph illustrating results of analyzing an area of a platinum (Pt) catalyst involved in a cathode reaction of each of the fuel cells of Manufacture Example 1 and Comparative Manufacture Examples 1 and 2.

The electrochemical surface area (ECSA) of a Pt catalyst involved in a cathode reaction of each of the fuel cells manufactured in Manufacture Example 1 and Comparative Manufacture Examples 1 and 2 was measured. The results are shown in FIG. 3. The area of the Pt catalyst involved in the cathode reaction was measured by cyclic voltammetry. The anode and the cathode were purged with hydrogen and nitrogen, respectively, and the cathode was scanned at a voltage of about 0.08 V to about 1 V to detect a hydrogen desorption peak between 0.08 V and 0.4 V. The total area of peaks as a function of cycle is proportional to the area of the Pt catalyst. Thus, a contact area between Pt and phosphoric acid may be calculated.

The utilization rate of Pt may be calculated from the contact area between Pt and phosphoric acid, calculated as described above, and the total amount of Pt used in the cathode.

The Pt utilization rate of the cathode of Manufacture Example 1 was found to be higher (26%) than that of the cathodes of Comparative Manufacture Examples 1 and 2 (both 22%).

Cell voltage characteristics of the fuel cells of Manufacture Example 1 and Comparative Manufacture Examples 1 and 2 as a function of current density were measured. The results are shown in FIG. 4.

Figure 4:
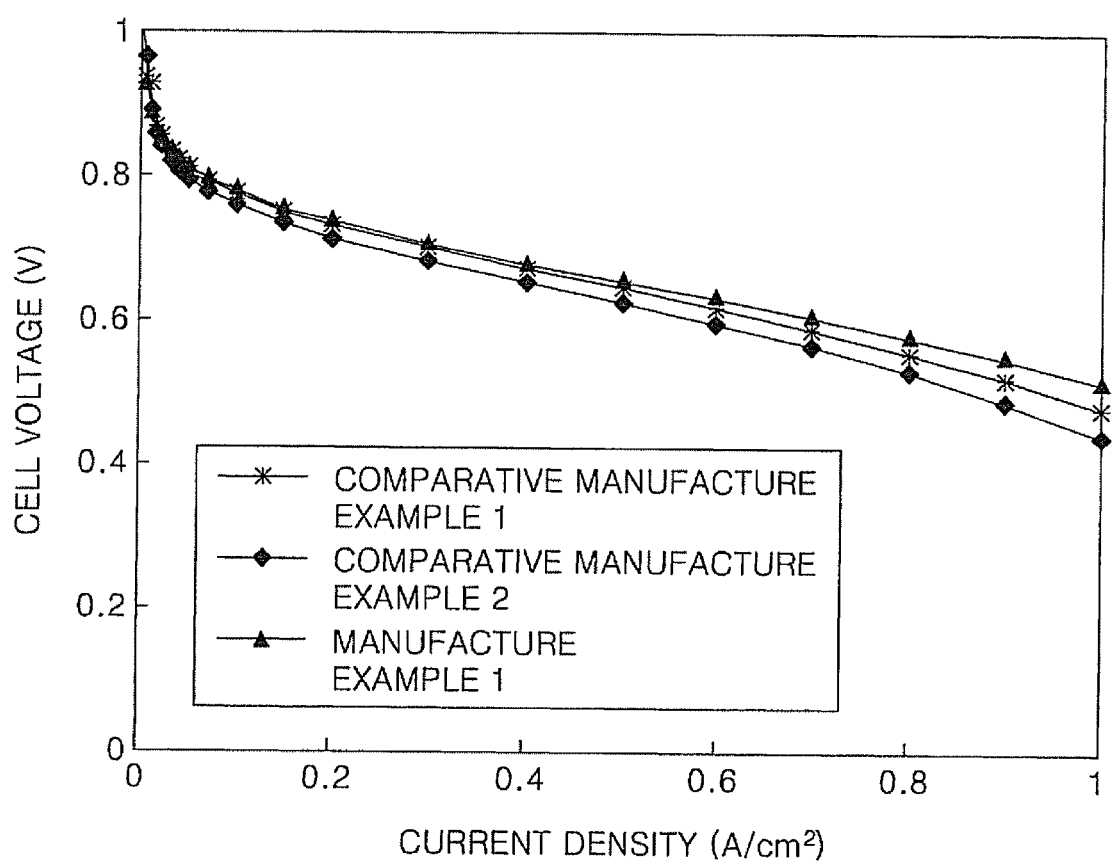
FIG. 4 is a graph illustrating cell voltage characteristics of the fuel cells of Manufacture Example 1 and Comparative Manufacture Examples 1 and 2 as a function of current density.

Referring to FIG. 4, the cell voltage characteristics of the fuel cell of Manufacture Example 1 were improved compared to those of the fuel cells of Comparative Manufacture Examples 1 and 2.

Cell voltage characteristics of the fuel cells of Manufacture Examples 2-4 and Comparative Manufacture Example 1 as a function of current density were measured. The results are shown in FIG. 5.

Figure 5:
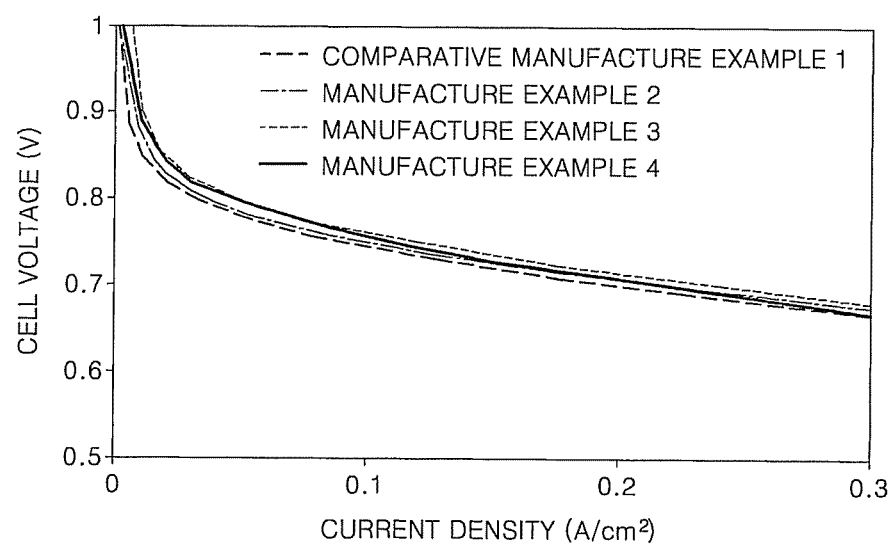
FIG. 5 is a graph of cell voltage characteristics as a function of current density in fuel cells manufactured according to Manufacture Examples 2-4 and Comparative Manufacture Example 1.

Referring to FIG. 5, the fuel cells of Manufacture Examples 2-4 are found to have better cell voltage characteristics than the fuel cell of Comparative Manufacture Example 1.

As described above, a composition according to the one or more of the above embodiments of the present invention, a uniform dispersion of polyoxazine-based compound particles having a small average particle diameter, may be uniformly dispersible in an electrode catalyst layer, and may be used to manufacture an electrode with the improved ability to retain phosphoric acid and improved resistance to high temperatures and acid.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode comprising:
    a support; and
    a catalyst layer disposed on the support, the catalyst layer comprising a coated product of a composition comprising a dispersion medium, and polyoxazine-based compound particles uniformly dispersed in the dispersion medium wherein the dispersion medium comprises at least one material selected from the group consisting of alcohol, acids, and hydrocarbonic solvents, the acid comprising polyphosphoric acid, phosphonic acid ($H_3PO_3$), an organic phosphonic acid, pyro-phosphoric acid ($H_4P_2O_7$), triphosphoric acid ($H_5P_3O_{10}$) or metaphosphoric acid, the hydrocarbonic solvent comprising N-methylpyrrolidine, dimethylacetamide, benzene or xylene, and the alcohol comprising ethanol; wherein the composition includes a catalyst selected from platinum or an alloy of platinum or a mixture of platinum and where the platinum utilization rate of the electrode is at least about 26%.

2. The electrode of claim 1, wherein the amount of the polyoxazine-based compound particles is in a range of about 1 to about 80 wt % based on the total weight of the composition.

3. The electrode of claim 1, wherein the polyoxazine-based compound particles have an average particle diameter of about 0.5 to about 10 μm.

4. A method of preparing the composition of claim 1, the method comprising:
mixing an oxazine-based monomer and an acid to prepare an acid solution of the oxazine-based monomer;
thermally treating the acid solution of the oxazine-based monomer to obtain a polymerization product;
separating the polyoxazine-based compound from the polymerization product; and
dispersing the polyoxazine-based compound in a dispersion medium.

5. The method of claim 4, wherein the acid comprises a phosphoric acid-based material.

6. The method of claim 4, wherein the amount of the acid in the acid solution of the oxazine-based monomer is in a range of about 1,000 to about 100,000 parts by weight based on 100 parts by weight of the oxazine-based monomer.

7. The method of claim 4, wherein the thermal treatment is performed at a temperature of about 150 to about 250° C.

8. The method of claim 4, wherein the separating of the polyoxazine-based compound from the polymerization product comprises:
adding water to the polymerization product and centrifuging the polymerization product to which the water is added, to obtain a centrifuged product; and
separating the solid content from the centrifuged product.

9. The method of claim 4, wherein the mixing of the oxazine-based monomer and the acid is performed at a temperature of about 50 to about 100° C.

10. The method of claim 4, wherein the oxazine-based monomer comprises at least one compound selected from the compounds represented by Formulae 1 through 6 below:

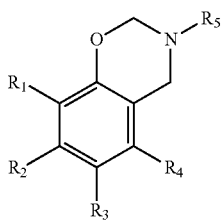

Formula 1 wherein, in Formula 1, $R_1$ through $R_4$ are each, independently, a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbocyclic oxy group, a substituted or unsubstituted $C_2$-$C_{20}$ heterocyclic group, a halogen atom, a hydroxy group, or a cyano group; and,
$R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

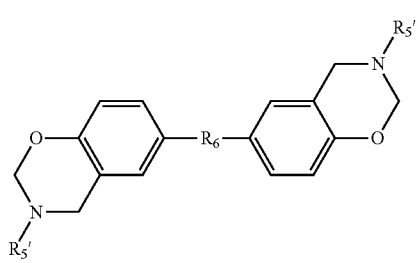

Formula 2 wherein, in Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and
$R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

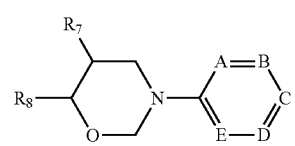

Formula 3 wherein, in Formula 3, A, B, C, D and E are all carbon, or one or two of A, B, C, D and E is nitrogen and the others are carbon, and
$R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group, or a fused $C_3$-$C_{10}$ heterocyclic group,

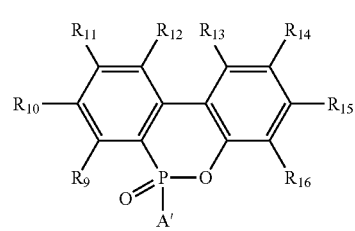

Formula 4 wherein, in Formula 4, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group, and $R_9$ to $R_{16}$ are each, independently, a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group, Formula 5

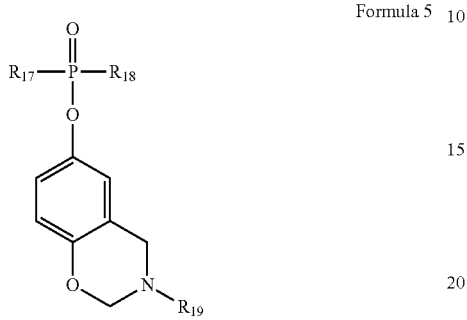

wherein, in Formula 5, $R_{17}$ and $R_{18}$ are each, independently, a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 5A below, Formula 5A

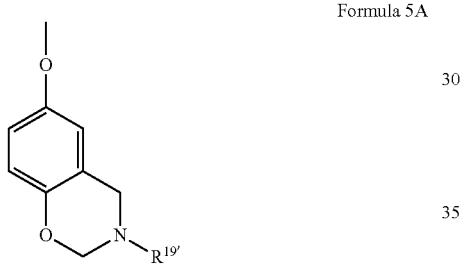

wherein, in Formulae 5 and 5A, $R_{19}$ and $R_{19}'$ are each, independently, selected from among a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group, Formula 6

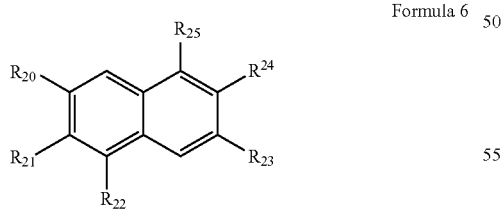

wherein, in Formula 6, at least two adjacent groups selected from among $R_{20}$, $R_{21}$ and $R_{22}$ are linked to form a group represented by Formula 6A below, and the non-selected, remaining group is selected from among a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, and a halogenated $C_1$-$C_{20}$ heterocyclic group, and at least two adjacent groups selected from among $R_{23}$, $R_{24}$ and $R_{25}$ are linked to form the group represented by Formula 6A below, and the non-selected, remaining group is selected from among a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group, and a halogenated $C_1$-$C_{20}$ heterocyclic group, Formula 6A

wherein, in Formula 6A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and \* denotes the sites at which the at least two adjacent groups selected from among $R_{20}$, $R_{21}$ and $R_{22}$ of Formula 6 and the at least two adjacent groups selected from among $R_{23}$, $R_{24}$ and $R_{25}$ are linked, respectively.

11. The method of claim 4, wherein the oxazine-based monomer comprises at least one compound selected from among compound (4FPh3AP) represented by Formula 16 below, a compound (3,4-FPh4FA) represented by Formula 28 below, a compound represented by Formula 66 below, a compound (HF-a) represented by Formula 62 below, a compound (3HP2AP) represented by Formula 89 below, and a compound (PPO) represented by Formula 116 below:

Formula 16

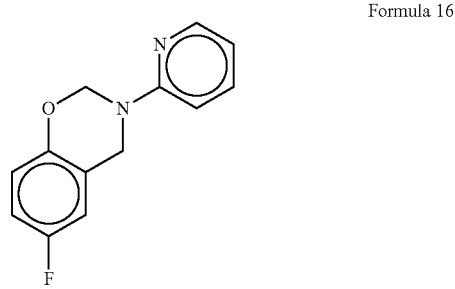

-continued

Formula 28

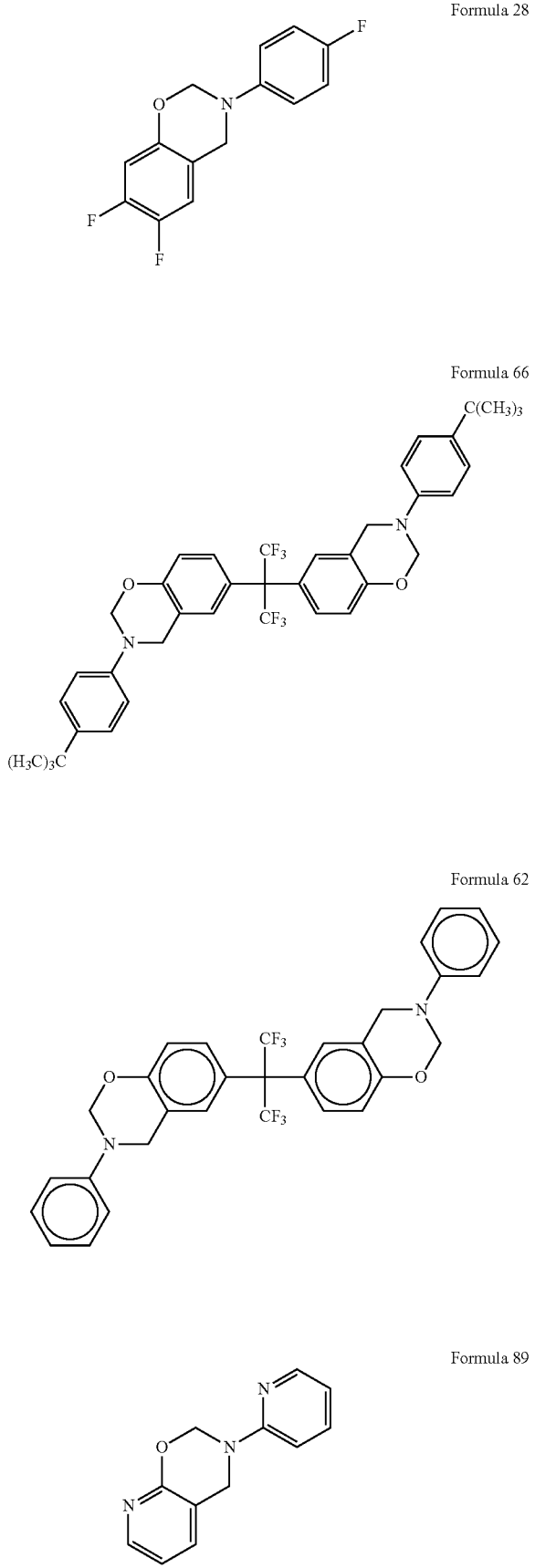

Formula 66

Formula 62

Formula 89

-continued

Formula 115

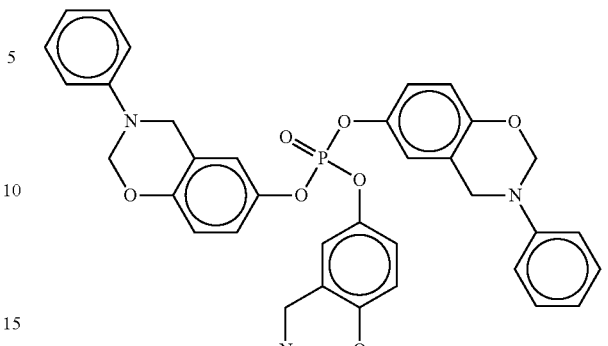

12. The electrode of claim 1, wherein the polyoxazine-based compound composition further comprises a cross-linkable compound.

13. The electrode of claim 1, wherein the catalyst layer further comprises a catalyst, and
the amount of the polyoxazine-based compound in the catalyst layer is in a range of about 0.001 to about 20 parts by weight based on 1 part by weight of the catalyst.

14. A fuel cell comprising the electrode of claim 1.

15. The electrode of claim 1, wherein the composition includes a catalyst selected from platinum or an alloy of platinum or mixture of platinum.

16. The electrode of claim 1, wherein the polyoxazine-based compound is a polymerization product of an oxazine-based monomer comprising at least one compound selected from the compounds represented by Formulae 1 through 6 below:

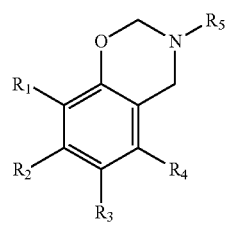

wherein, in Formula 1, R1 through R4 are each, independently, a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbon ring group, a substituted or unsubstituted C4-C20 carbocyclic oxy group, a substituted or unsubstituted C2-C20 heterocyclic group, a halogen atom, a hydroxy group, or a cyano group; and, R5 is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group,

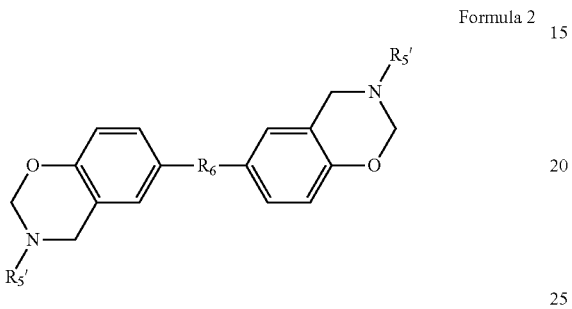

Formula 2 wherein, in Formula 2, R5' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, and R6 is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO2-,

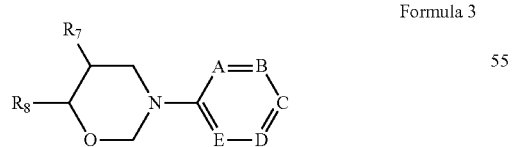

Formula 3 wherein, in Formula 3, A, B, C, D and E are all carbon, or one or two of A, B, C, D and E is nitrogen and the others are carbon, and R7 and R8 are linked to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group,

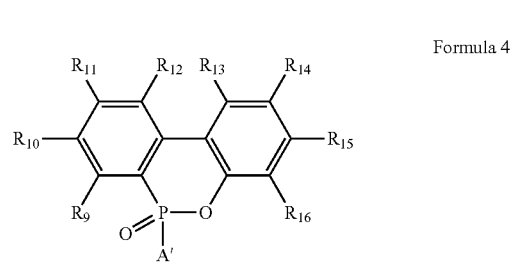

Formula 4 wherein, in Formula 4, A' is a substituted or unsubstituted C1-C20 heterocyclic group, a substituted or unsubstituted C4-C20 cycloalkyl group, or a substituted or unsubstituted C1-C20 alkyl group, and R9 to R16 are each, independently, a hydrogen atom, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

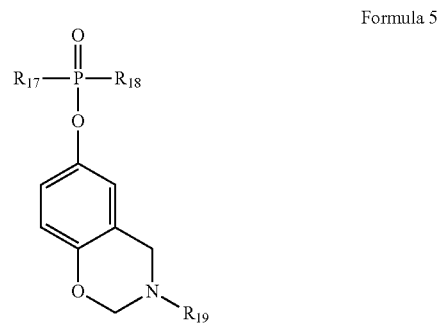

Formula 5 wherein, in Formula 5, R17 and R18 are each, independently, a C1-C20 alkyl group, a C1-C20 alkoxy group, a C6-C20 aryl group, a C6-C20 aryloxy group or a group represented by Formula 5A below,

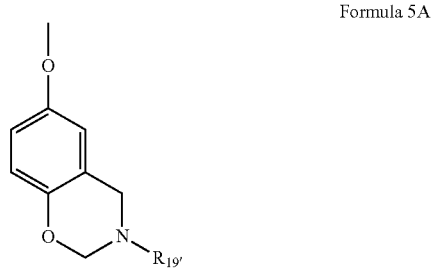

Formula 5A wherein, in Formulae 5 and 5A, R19 and R19' are each, independently, selected from among a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group or a halogenated C1-C20 heterocyclic group,

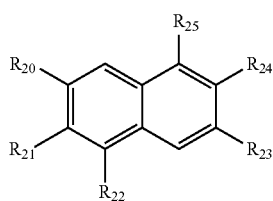

Formula 6 wherein, in Formula 6, at least two adjacent groups selected from among R20, R21 and R22 are linked to form a group represented by Formula 6A below, and the non-selected, remaining group is selected from among a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, and a halogenated C1-C20 heterocyclic group, and at least two adjacent groups selected from among R23, R24 and R25 are linked to form the group represented by Formula 6A below, and the non-selected, remaining group is selected from among a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, and a halogenated C1-C20 heterocyclic group,

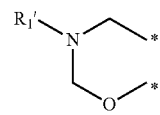

Formula 6A wherein, in Formula 6A, R1' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, and

* denotes the sites at which the at least two adjacent groups selected from among R20, R21 and R22 of Formula 6 and the at least two adjacent groups selected from among R23, R24 and R25 are linked, respectively.

* * * * *